US012561222B2

(12) United States Patent
Yadagiri et al.

(10) Patent No.: US 12,561,222 B2
(45) Date of Patent: Feb. 24, 2026

(54) REDUCING BIAS IN MACHINE LEARNING MODELS UTILIZING A FAIRNESS DEVIATION CONSTRAINT AND DECISION MATRIX

(71) Applicant: Adobe Inc., San Jose, CA (US)

(72) Inventors: Meghanath Macha Yadagiri, San Jose, CA (US); Anish Narang, Santa Clara, CA (US); Deepak Pai, Sunnyvale, CA (US); Sriram Ravindran, San Jose, CA (US); Vijay Srivastava, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 937 days.

(21) Appl. No.: 17/805,377

(22) Filed: Jun. 3, 2022

(65) Prior Publication Data

US 2023/0393960 A1 Dec. 7, 2023

(51) Int. Cl.
*G06F 11/34* (2006.01)
*G06F 18/21* (2023.01)
(Continued)

(52) U.S. Cl.
CPC ...... *G06F 11/3452* (2013.01); *G06F 18/2178* (2023.01); *G06F 18/24* (2023.01); *G06N 20/00* (2019.01)

(58) Field of Classification Search
CPC .. G06F 11/3452; G06F 11/34; G06F 18/2178; G06F 18/217; G06F 18/24; G06N 20/00
(Continued)

(56) References Cited

U.S. PATENT DOCUMENTS

2015/0220806 A1* 8/2015 Heller ................. G06F 16/5866
382/159
2020/0082299 A1* 3/2020 Vasconcelos .......... G06N 20/00
(Continued)

OTHER PUBLICATIONS

Zhang et al., "A New Strategy of Cost-Free Learning in the Class Imbalance Problem", IEEE Transactions on Knowledge and Data Engineering, vol. 26, No. 12, Dec. 2014, pp. 2872-2885. (Year: 2014).*

(Continued)

*Primary Examiner* — Hwei-Min Lu
(74) *Attorney, Agent, or Firm* — Keller Preece PLLC

(57) ABSTRACT

The present disclosure relates to systems, methods, and non-transitory computer readable media that control bias in machine learning models by utilizing a fairness deviation constraint to learn a decision matrix that modifies machine learning model predictions. In one or more embodiments, the disclosed systems generate, utilizing a machine learning model, predicted classification probabilities from a plurality of samples comprising a plurality of values for a data attribute. Moreover, the disclosed systems determine utilizing a decision matrix and the predicted classification probabilities, that the machine learning model fails to satisfy a fairness deviation constraint with respect to a value of the data attribute. In addition, the disclosed systems generate a modified decision matrix for the machine learning model to satisfy the fairness deviation constraint by selecting a modified decision threshold for the value of the data attribute.

20 Claims, 13 Drawing Sheets

(51) Int. Cl.
*G06F 18/24* (2023.01)
*G06N 20/00* (2019.01)
(58) Field of Classification Search
USPC ......................................................... 706/12
See application file for complete search history.

(56) References Cited

U.S. PATENT DOCUMENTS

| | | | | |
|---|---|---|---|---|
| 2020/0184350 | A1* | 6/2020 | Bhide | G06N 5/04 |
| 2020/0226489 | A1* | 7/2020 | Li | G06N 3/0475 |
| 2020/0285999 | A1* | 9/2020 | McGovern | G06N 20/00 |
| 2020/0320428 | A1* | 10/2020 | Chaloulos | G06N 20/00 |
| 2020/0372406 | A1* | 11/2020 | Wick | G06N 20/00 |
| 2021/0224605 | A1* | 7/2021 | Zhang | G06N 20/00 |
| 2021/0287119 | A1* | 9/2021 | Rink | G06Q 30/0201 |
| 2021/0374581 | A1* | 12/2021 | Wei | G06N 20/00 |
| 2021/0383268 | A1* | 12/2021 | Miroshnikov | G06N 20/00 |
| 2022/0012591 | A1* | 1/2022 | Dalli | G06F 18/10 |
| 2022/0036203 | A1* | 2/2022 | Nachum | G06N 20/00 |
| 2022/0114399 | A1* | 4/2022 | Castiglione | G06N 3/045 |
| 2022/0172004 | A1* | 6/2022 | Das | G06F 9/542 |

OTHER PUBLICATIONS

Hardt et al, "Equality of Opportunity in Supervised Learning", arXiv: 1610.02413, Oct. 7, 2016, pp. 1-22. (Year: 2016).*
Chen et al., "Towards Threshold Invariant Fair Classification", ARXIV ID: 2006.10667, Jun. 18, 2020,. (Year: 2020).*
Zhang, et al., "Fairness Constraints in Semi-supervised Learning", ARXIV ID: 2009.06190, Sep. 14, 2020, pp. 1-12. (Year: 2020).*
Naghiaei et al., "CPFair: Personalized Consumer and Producer Fairness Re-ranking for Recommender Systems", arXiv: 2204. 08085, Apr. 17, 2022. (Year: 2022).*
AWS; "Amazon Fraud Detector: Detect online fraud faster with machine learning" Date downloaded Jul. 7, 2022; https://aws.amazon. com/fraud-detector/.
Microsoft; "Real-time fraud detection"; Date downloaded Jul. 7, 2022; https://docs.microsoft.com/en-us/azure/architecture/example- scenario/data/fraud-detection.
LexisNexis Risk Solutions; Comprehensive Fraud Prevention and Frictionless Customer Experience; Date downloaded Jul. 7, 2022; https://risk.lexisnexis.com/products/threatmetrix.
Gartner; "Products In Online Fraud Detection (OFD) Market"; Date downloaded Jul. 7, 2022; https://www.gartner.com/reviews/market/ online-fraud-detection-systems.
Agarwal, Alekh et al. "Fair Regression: Quantitative Definitions and Reduction-based Algorithms." ICML (2019).
Beutel, Alex; Chen, Jilin; Zhao, Zhe; Chi, Ed H.; "Data Decisions and Theoretical Implications when Adversarially Learning Fair Representations"; arXiv:1707.00075v2 [cs.LG]; Jul. 7, 2017.
T. Calders, F. Kamiran and M. Pechenizkiy, "Building Classifiers with Independency Constraints," 2009 IEEE International Confer- ence on Data Mining Workshops, 2009, pp. 13-18, doi: 10.1109/ ICDMW.2009.83.
Chzhen, Evgenii and Denis, Christophe and Hebiri, Mohamed and Oneto, Luca and Pontil; "Leveraging Labeled and Unlabeled Data for Consistent Fair Binary Classification"; arXiv;1906.05082v2 [math.ST]; Feb. 4, 2020.
Chouldechova, Alexandra. "Fair prediction with disparate impact: A study of bias in recidivism prediction instruments." Big data 5.2 (2017): 153-163.
Fu, Runshan, et al. "'Un'Fair Machine Learning Algorithms." Available at SSRN 3408275 (2020).
Foulds, James R., et al. "An intersectional definition of fairness." 2020 IEEE 36th International Conference on Data Engineering (ICDE). IEEE, 2020.
Zhang, Hantian, et al. "OmniFair: A Declarative System for Model- Agnostic Group Fairness in Machine Learning." Proceedings of the 2021 International Conference on Management of Data. 2021.
Han, Jiawei, Jian Pei, and Yiwen Yin. "Mining frequent patterns without candidate generation." ACM sigmod record 29.2 (2000): 1-12.
Green, Samuel B. "How many subjects does it take to do a regression analysis." Multivariate behavioral research 26.3 (1991): 499-510.
Forter; "Fraud Management—Maximize revenue and find the right balance with smarter fraud decisions"; Date downloaded Jul. 9, 2025; https://www.forter.com/trusted-conversions/.

* cited by examiner

900

Generating Predicted Classification Probabilities Utilizing A Machine Learning Model 902

Determining That The Machine Learning Model Fails To Satisfy A Fairness Deviation Constraint 904

Generating A Decision Matrix For The Machine Learning Model To Satisfy The Fairness Deviation Constraint 906

1000

Generating A Predicted Classification Probability From A Sample *1002*

Determining A Decision Threshold From A Decision Matrix *1004*

Generating A Classification For The Sample Utilizing The Decision Threshold And The Predicted Classification *1006*

REDUCING BIAS IN MACHINE LEARNING MODELS UTILIZING A FAIRNESS DEVIATION CONSTRAINT AND DECISION MATRIX

BACKGROUND

Recent years have seen significant advancements in machine learning algorithms trained to make decisions in a variety of critical areas. For example, some artificial intelligence models analyze digital signals to generate predictions with regard to digital security in determining whether to provide access to sensitive digital information (or other digital services) to client devices. The proliferation of machine learning models, however, has introduced a number of concerns. For example, black box training approaches often result in machine learning models with learned parameters that are biased or discriminatory with respect to sensitive data attributes. The field of detecting and mitigating bias in machine-learning models faces a variety of technical problems with regard to accuracy, efficiency, flexibility, security, and privacy of implementing computing devices.

SUMMARY

This disclosure describes one or more embodiments of systems, methods, and non-transitory computer readable media that solve one or more of the foregoing or other problems in the art by utilizing a fairness deviation constraint and a decision matrix to modify and reduce bias in machine learning model predictions. In particular, in one or more embodiments the disclosed systems utilize a fairness deviation constraint that reflects a relaxed equality condition for false positive rates and true positive rates. For example, the disclosed systems impose a fairness deviation constraint that confines machine learning model performance rates for particular data attributes to fall within a particular performance deviation relative to the mean. In one or more embodiments, the disclosed systems enforce the fairness deviation constraint by learning a decision matrix applicable to the predicted output probabilities of various machine learning model architectures. In one or more embodiments, the disclosed systems iteratively modify thresholds of the decision matrix for values of one or more data attributes so that the machine learning model satisfies the fairness deviation constraint during implementation.

In addition, in one or more embodiments the disclosed systems flexibly modify the fairness constraint (e.g., based on user selection). For example, the disclosed systems flexibly analyze false positive and/or true positive rates depending on the particular context at issue. Moreover, in one or more embodiments the disclosed systems control for bias across multiple different data attributes, utilizing various approaches to apply the fairness deviation constraint across possible sub-populations. In addition, in one or more implementations the disclosed systems also apply across a variety of values, handling multiple high arity data attributes simultaneously. Furthermore, by applying the decision matrix to machine learning model predictions, in one or more implementations the disclosed systems flexibly apply across a variety of machine learning model architectures while preserving privacy and security of the underlying data and learning mechanism.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
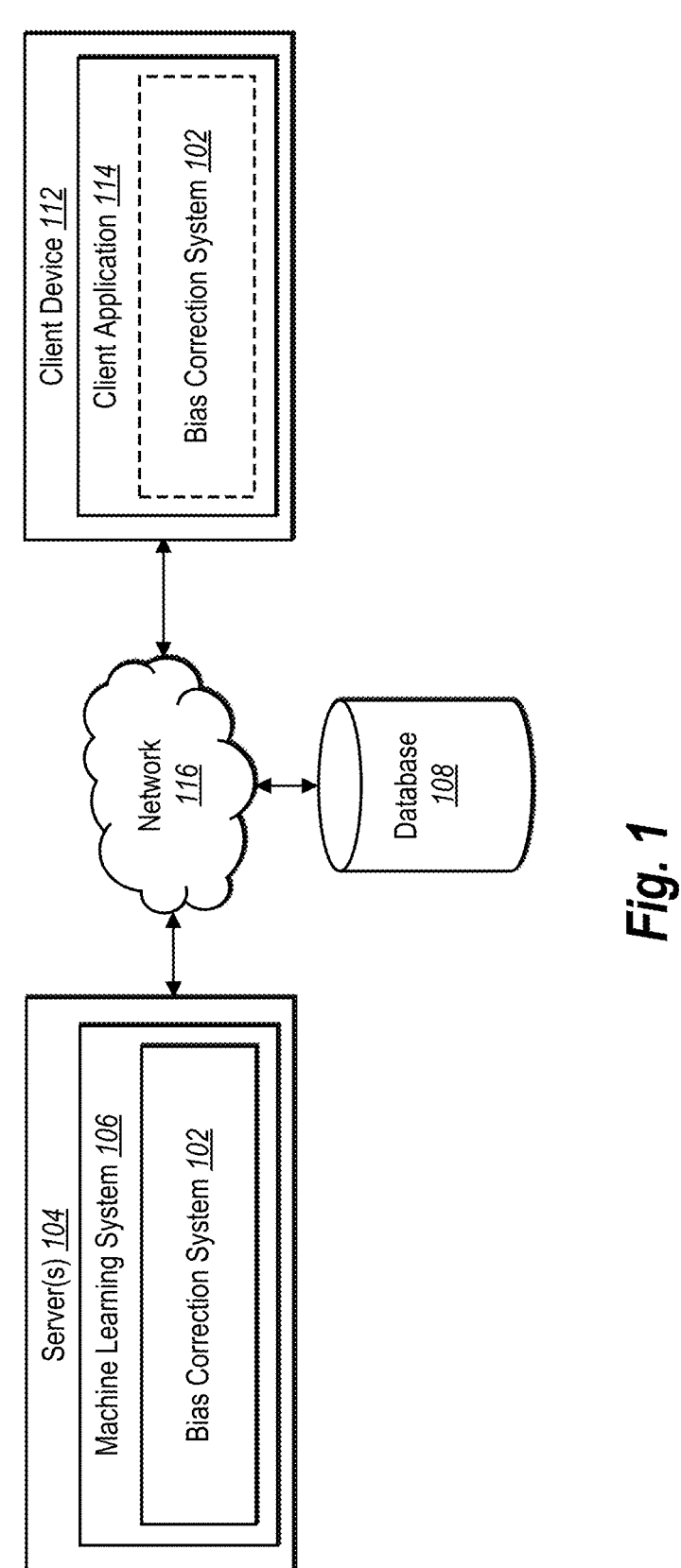
FIG. 1 illustrates an example system environment in which a bias correction system operates in accordance with one or more embodiments.

This disclosure describes one or more embodiments of a bias correction system that controls bias in machine learning models by utilizing a fairness deviation constraint to learn a decision matrix that modifies machine learning model predictions. As mentioned above, conventional systems suffer from a number of technical deficiencies with regard to accuracy, efficiency, flexibility, security, and privacy. For example, many conventional systems that seek to account for bias suffer from type-1 and type-2 errors. To illustrate, some conventional systems require parity across values of data attributes, such as demographic parity across different countries of the world. However, sanitizing a machine learning model (such as a security or piracy detection machine learning model) to ensure demographic parity results in significant inaccuracies within the predicted results (e.g., allowing significant piracy or inhibiting genuine client devices from accessing pertinent data).

Some conventional systems seek to address bias in machine learning by seeking to impose equalized odds or equalized opportunity (e.g., across false positives and false negatives); however, this approach undermines accuracy and flexibility because it fails to account for the fact that false positives and false negatives have significantly different impacts. Moreover, imposing "equal" rates in theory rarely results in equalized rates in practice, as fluctuations in implementation often undermine the stated objective. In addition, conventional systems are often limited in applicability. For example, conventional systems assume binary sensitive attributes but such constraints are not viable in many machine learning model applications with high arity attributes that require real time inference. In addition, conventional systems cannot sanitize machine learning models across multiple protected attributes in a post-hoc fashion.

Conventional systems are also inefficient. Indeed, conventional systems are primarily catered toward binary sensitive attributes and require multiple sanitations (one per each categorical attribute) to achieve fairness in the outcomes. Accordingly, conventional systems require multiple, duplicative sanitation processes that increase time and computing resources to implement.

Furthermore, conventional systems often undermine privacy, security, flexibility, and fidelity of machine learning models by modifying underlying data and/or machine learning parameters to control bias. These approaches repeatedly expose private, secure training data and require modification of the machine learning model itself. Moreover, many of these approaches are specific to particular model architectures or training approaches, and thus cannot apply across the wide variety of existing machine learning model architectures or training approaches.

In one or more embodiments, the bias correction system utilizes a fairness deviation constraint that includes a relaxed equality condition for false positive rates and true positive rates. Indeed, in contrast to the systems just discussed, in one or more embodiments the bias correction systems imposes a fairness deviation constraint that confines machine learning model performance rates for particular data attributes to fall within a performance deviation relative to a performance mean (e.g., two standard deviations relative to the mean of a performance metric). Thus, for example, the bias correction system determines a mean performance rate (e.g., false positive or false negative rate) across values of a data attribute. The bias correction system also determines a standard deviation of performance across values of the data attribute. In one or more implementations, the bias correction system imposes a fairness deviation constraint such that the performance rate for each value in implementing a machine learning model falls within two standard deviations of the mean.

As mentioned, in one or more embodiments, the bias correction system enforces the fairness deviation constraint by learning a decision matrix. For example, a decision matrix includes a plurality of decision thresholds specific to individual values of a data attribute. In one or more embodiments, the bias correction system learns the individual decision thresholds of the decision matrix by iteratively analyzing performance rates of the machine learning model utilizing the fairness deviation constraint.

To illustrate, the bias correction system identifies performance rates for each value of a data attribute and compares the performance rate to the fairness deviation constraint. Upon identifying values that fail to satisfy the fairness deviation constraint, the bis correction system modifies the decision threshold (utilizing an accuracy model, such as an F0.5, F1, or F2 algorithm) to determine modified decision thresholds. By iteratively modifying decision thresholds using this approach, in one or more embodiments the bias correction system determines a decision matrix that causes the machine learning model to satisfy the fairness deviation constraint across values.

Upon learning the decision matrix, in one or more embodiments the bias correction system applies the decision matrix to the machine learning model to reduce bias in machine learning model predictions. For example, the bias correction system identifies a new sample (e.g., a client device seeking to access digital information). The bias correction system extracts one or more features/values corresponding to the sample (e.g., country of origin). The bias correction system utilizes the one or more features and the machine learning model to generate a classification probability for the sample (e.g., a probability of whether the client device is a pirate). The bias correction system controls for bias by identifying a decision threshold specific to the value of the data attribute (e.g., the country of origin) from the decision matrix and applying the decision threshold to the classification probability. Thus, the bias correction system controls bias in the resulting classification by applying the decision threshold to the classification probability generated by the machine learning model.

Although the foregoing example describes a single data attribute, in one or more embodiments the bias correction system analyzes multiple values of multiple data attributes in correcting bias. Indeed, in one or more embodiments the bias correction system determines a decision matrix that includes decision thresholds for sub-populations defined by the intersection of multiple values from different attributes. As described in greater detail below, the bias correction system utilizes multiple approaches to determine these decision thresholds. In some embodiments, the bias correction system determines decision thresholds for individual values and then combines these values to determine decision thresholds for sub-populations defined by multiple values. Moreover, in some embodiments, the bias correction system directly learns decision thresholds for individual sub-populations. In one or more implementations, the bias correction system reduces the computational complexity of this multi-attribute analysis by performing a two-step pruning of attributes and data.

Furthermore, in one or more embodiments, the bias correction system provides options for defining the particular fairness deviation constraints (and/or accuracy models) utilized to control for bias. For example, the bias correction system provides a graphical user interface to a managing device that allows the managing device to select between false positive rate, true positive rate, or both in controlling bias of a machine learning model. Thus, the bias correction system can sanitize biases to conform to different fairness deviation constraints particular to the contexts of a particular machine learning model or implementation.

As mentioned, in one or more embodiments the bias correction system provides a variety of advantages over conventional systems, particularly with regard to accuracy, efficiency, flexibility, security, and privacy. For example, by utilizing a fairness deviation constraint, the bias correction system improves accuracy relative to conventional systems. To illustrate, by utilizing a fairness deviation constraint, the bias correction system can account for bias while mitigating type-1 and type-2 errors caused by requiring parity across data values. Thus, for example, in applying a security or piracy detection machine learning model, the bias correction system can apply a fairness deviation constraint defined by a deviation relative to a mean of a performance metric that avoids allowing for significant piracy and/or excessively inhibiting genuine client devices.

Furthermore, the bias correction system improves conventional systems that rigidly impose equalized odds or equalized opportunity. Indeed, by utilizing a fairness deviation constraint (and allowing for selection of false positive and/or false negative rates in defining the fairness deviation constraint), the bias correction system accounts for the impact of different performance rates on different systems. Moreover, the bias correction system avoids the rigidity of imposing equalized rates while correcting for bias within defined deviations relative to a performance mean.

In addition, in one or more embodiments the bias correction system further improves flexibility relative to conventional systems by expanding the number and variety of compatible values and data attributes. For example, unlike conventional systems limited to binary attributes, in one or more implementations the bias correction system is designed to handle high arity categorical attributes simultaneously. Indeed, as mentioned above, in some implementations the bias correction system learns decision thresholds across values simultaneously in generating a decision matrix. Moreover, unlike conventional systems that mainly cater towards sanitizing a machine learning model to conform to fairness across a single protected attribute, in one or more implementations the bias correction system handles multiple protected attributes at scale.

Furthermore, in one or more embodiments the bias correction system also improves efficiency. Indeed, in contrast to conventional systems that require multiple sanitations for each categorical attribute value, in one or more implementations the bias correction system simultaneously learns decision thresholds for various data values (and data attributes). Moreover, as mentioned above, the bias correction system utilizes various pruning approaches to reduce computational complexity on analyzing multiple data attributes. Accordingly, in one or more embodiments the bias correction system reduces time and computing resources (e.g., memory and processing power) relative to conventional systems.

In addition, in some implementations the bias correction system also improves privacy, security, flexibility, and fidelity to machine learning models. For example, as mentioned, in one or more embodiments the bias correction system applies decision thresholds from a decision matrix to predicted classification probabilities of machine learning model. Thus, in one or more embodiments the bias correction system analyzes aggregate information about model outputs and can be applied in a differentially private manner. Moreover, the bias correction system does not undermine model fidelity by changing machine learning pipelines or changing model learning mechanisms or architectures. Furthermore, by processing model outputs (rather than model intrinsics or training), the bias correction system can apply to a variety of machine learning model architectures that utilize a variety of training processes.

Additional detail regarding the bias correction system will now be provided with reference to the figures. For example, FIG. 1 illustrates a schematic diagram of an example system environment (or "environment") 100 for implementing a bias correction system 102 in accordance with one or more embodiments. An overview of the bias correction system 102 is described in relation to FIG. 1. Thereafter, a more detailed description of the components and processes of the bias correction system 102 is provided in relation to the subsequent figures.

As shown, the environment 100 includes server(s) 104, a database 108, a client device 112, and a network 116. Each of the components of the environment 100 communicate via the network 116, and the network 116 is any suitable network over which computing devices/processing devices communicate. Example networks are discussed in more detail below in relation to FIG. 13.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single instance of the client device 112, in some embodiments, the environment 100 includes multiple different client devices, each associated with a different user.

The client device 112 communicates with the server(s) 104 via the network 116. For example, the client device 112 provides information to the server(s) 104 such as one or more values of one or more data attributes and/or client device interactions. Thus, in some cases, the bias correction system 102 implemented via the server(s) 104 provides and receives information based on client device interaction via the client device 112. The client device 112 also receives information from the server(s) 104 such as a classification prediction or digital information resulting from a classification prediction. For example, the server(s) 104 can act as a gatekeeper to sensitive digital information. In response to classifying the client device 112 as secure, the server(s) can provide sensitive digital information to the client device 112.

As shown in FIG. 1, the client device 112 includes a client application 114. In particular, in one or more embodiments the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user.

As illustrated in FIG. 1, the environment 100 includes the server(s) 104. The server(s) 104 generates, tracks, stores, processes, receives, and transmits electronic data, such as values of data attributes, machine learning models, and/or machine learning model predictions. For example, the server(s) 104 receives data from the client device 112. In response, the server(s) 104 transmits data to the client device 112 to cause the client device 112 to provide information for display.

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, a multidimensional server, or a machine learning server. In one or more embodiments, the server(s) 104 further access and utilize a database to store and retrieve information. Such a database includes values of data attributes for historical users together with machine learning model predictions and ground truth information regarding the predictions.

As further shown in FIG. 1, the server(s) 104 also includes the bias correction system 102 as part of a machine learning system 106. For example, in one or more implementations, the machine learning system 106 generates, trains, modifies, applies, implements, provides, distributes, and/or shares machine learning models. For example, the machine learning system 106 trains and implements various machine learning models, such as fraud detection machine learning models, digital object classification models, risk evaluation machine learning models, security machine learning models, user classification machine learning models, or digital content selection/distribution machine learning models.

In one or more embodiments, the server(s) 104 includes all, or a portion of, the bias correction system 102. For example, the bias correction system 102 operates on the server(s) 104 to classification predictions for the client device 112. In certain cases, as illustrated in FIG. 1, the client device 112 includes all or part of the bias correction system 102. For example, in one or more embodiments the client device 112 generates predictions utilizing one or more machine learning models.

In some embodiments, the server(s) 104 train one or more machine-learning models described herein. The bias correction system 102 on the server(s) 104 provides the one or more trained machine-learning models to the bias correction system 102 on the client device 112 for implementation. Accordingly, although not illustrated, in one or more embodiments the client devices 112 utilizes the bias correction system 102 to generate predictions.

In some embodiments, the bias correction system 102 includes a web hosting application that allows the client devices 112 to interact with content and services hosted on the server(s) 104. To illustrate, in one or more implementations, the client devices 112 accesses a web page or computing application supported by the server(s) 104. The client device 112 provides input to the server(s) 104. In response, the bias correction system 102 on the server(s) 104 utilizes the trained machine learning model to generate a prediction. The server(s) 104 then provides the recommendation to the client device 112.

In some embodiments, though not illustrated in FIG. 1, the environment 100 has a different arrangement of components and/or has a different number or set of components altogether. For example, in certain embodiments, the client device 112 communicates directly with the server(s) 104, bypassing the network 116. As another example, the environment 100 includes a third-party server comprising a content server and/or a data collection server.

As mentioned above, in one or more embodiments the bias correction system 102 generates sanitized predictions (e.g., sanitized classification predictions) for a machine learning model utilizing a decision matrix. For example, FIG. 2 illustrates the bias correction system 102 utilizing a machine learning model 208 and a decision matrix 216 to generate a classification 218 in accordance with one or more embodiments.

Figure 2:
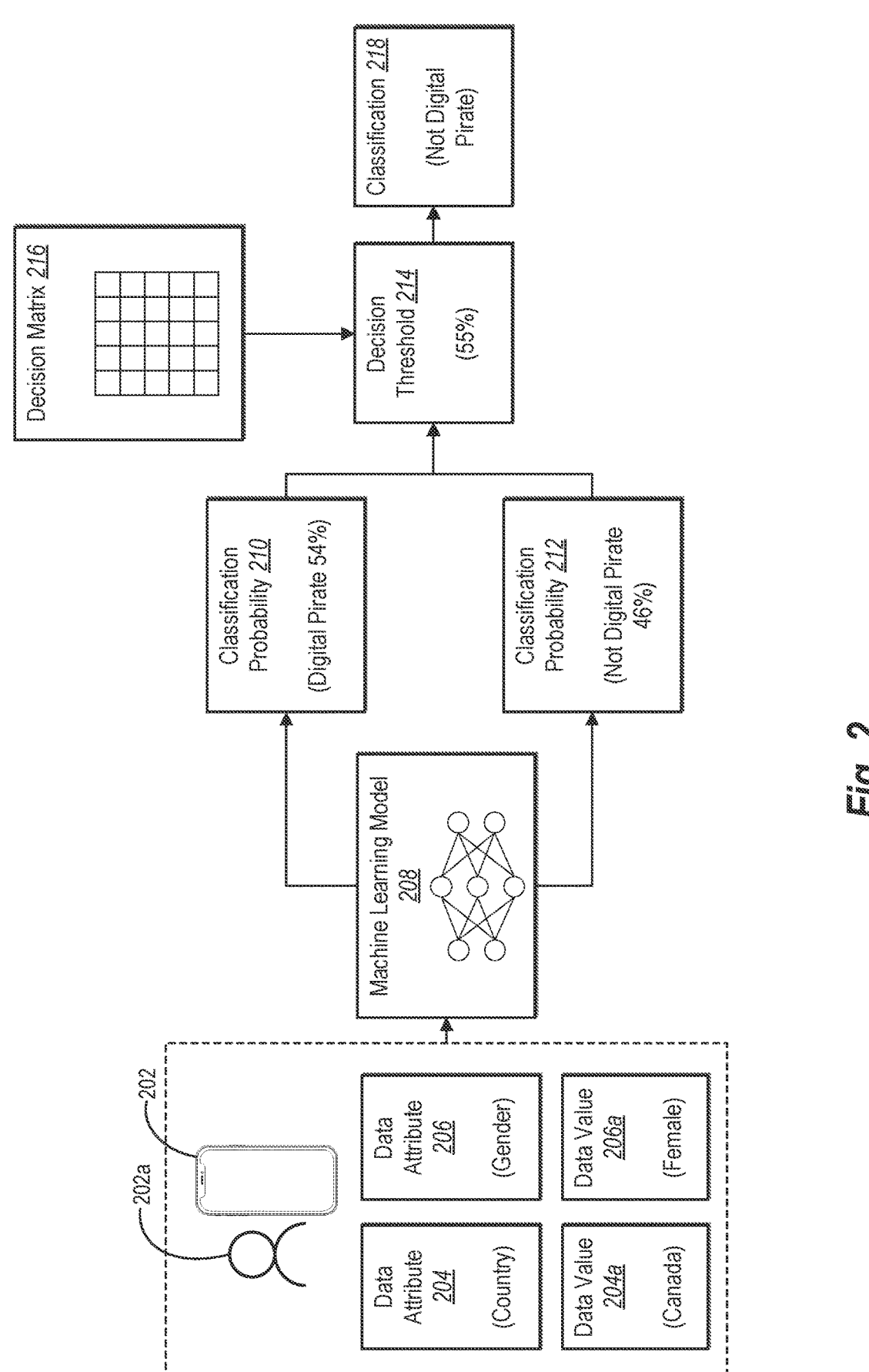
FIG. 2 illustrates an overview of generating a sanitized classification utilizing a machine learning model and a decision threshold from a decision matrix in accordance with one or more embodiments.

As shown in FIG. 2, the bias correction system 102 identifies a sample corresponding to a client device 202 (and/or a user 202a). As shown, the sample has a plurality of data attributes 204, 206. In particular, the bias correction system 102 determines that the user 202a corresponding to the client device 202 has a data value 204a corresponding to a data attribute 204 (e.g., a value of Canada for a data attribute of country) and a data value 206a corresponding to a data attribute 206 (e.g., a value of female for a data attribute of gender).

As illustrated, the bias correction system 102 reduces bias with respect to the data attributes 204, 206 in relation to the machine learning model 208. For example, the machine learning model 208 includes a computer-implemented model trained and/or tuned based on inputs to approximate unknown functions. To illustrate, in one or more embodiments the machine learning model 208 includes a computer algorithm with branches, weights, or parameters that are changed/learned based on training data to improve for a particular task. Thus, in one or more implementations the machine learning model 208 utilizes one or more machine learning techniques (e.g., supervised or unsupervised learning) to improve in accuracy and/or effectiveness. Example machine learning models include various types of decision trees, support vector machines, Bayesian networks, logistic regressions, random forest models, or neural networks (e.g., deep neural networks).

In various embodiments, the machine learning model 208 generates a variety of predictions or outputs. As mentioned above, for example, in some implementations the machine learning model 208 includes a fraud detection machine learning model that generates a fraud classification prediction. In one or more embodiments, the machine learning model 208 generates other predictions. For example, in some implementations the machine learning model 208 generates a prediction for digital content to provide to the client device 112, a digital prediction with regard to one or more unknown characteristics or features of the client device 202 (and/or the user 202a), a risk prediction, a digital prediction with regard to conversion, or some other prediction or classification.

In relation to FIG. 2, the machine learning model 208 analyzes the data attributes 204, 206 (and possibly other data attributes) to generate a classification probability 210 (e.g., a probability that the client device 202 is a digital pirate) and a classification probability 212 (e.g., a probability that the client device 202 is not a digital pirate). Under normal circumstances, the machine learning model 208 would generate a classification prediction that the client device 202 is a digital pirate. Indeed, because the classification probability 210 is above 50%, the machine learning model 208 would determine that the client device 202 is a digital pirate and withhold digital information (or limit digital features) corresponding to the client device 202.

As shown in FIG. 2, the bias correction system 102 accesses a decision matrix 216 and selects a decision threshold 214. The decision matrix 216 includes a plurality of decision thresholds corresponding to various values of data attributes (and/or sub-populations representing combinations of values for different data attributes). For example, the decision matrix 216 includes a first threshold for a first value of a data attribute and a second threshold for a second value of a data attribute. The bias correction system 102 generates the decision matrix 216 such that the selected thresholds cause the machine learning model 208 to satisfy a fairness deviation constraint. Additional detail regarding the bias correction system 102 generating the decision matrix 216 based on fairness deviation constraints is provided below (e.g., in relation to FIGS. 3A-6).

With regard to FIG. 2, the bias correction system 102 identifies the decision threshold 214 based on one or more of the data values 204a, 206a of the data attributes 204, 206. In particular, the bias correction system 102 identifies sensitive data attributes (e.g., based on user input), and selects the decision threshold 214 to control bias with regard to the sensitive data attributes. Thus, the bias correction system 102 selects the decision threshold 214 to control for bias with regard to the data attributes 204, 206 (e.g., to control for bias with regard to country and gender). Based on the data value 204*a* (Canada) and the data value 206*a* (female), the bias correction system 102 selects the decision threshold 214 (i.e., 55%).

As illustrated, the bias correction system 102 applies the decision threshold 214 to the classification probability 210. In particular, by comparing the classification probability 210 (54%) with the decision threshold 214 (55%) the bias correction system 102 determines that the classification probability 210 fails to satisfy the decision threshold 214. Accordingly, the bias correction system 102 generates a classification 218 (i.e., a negative classification that the client device 202 is not a digital pirate). Indeed, by utilizing the decision threshold 214, the bias correction system 102 reduces discriminatory or unfair results for values of sensitive data attributes.

Although FIG. 2 illustrates the machine learning model 208 generating a binary classification (e.g., pirate or not a pirate), the bias correction system 102 can operate with regard to a variety of predictions or classifications. For instance, the machine learning model 208 can generate a multi-class prediction (e.g., a range of risk values or a particular limit, such as a credit limit) for the client device 202. In one or more embodiments, the bias correction system 102 generates various decision thresholds for each class or prediction type.

Moreover, although FIG. 2 illustrates a particular set of values for particular data attributes, the bias correction system 102 can operate across a variety of different values and attributes. Thus, in response to a new sample (a new client device), the bias correction system 102 can determine a new set of values for the attributes, utilize the machine learning model 208 to generate new classification probabilities, determine a new decision threshold particular to the new set of values, and generate a new sanitized classification.

Moreover, although FIG. 2 illustrates a sample that includes the client device 202 and the user 202*a*, the bias correction system 102 also operates in relation to samples that do not correspond to client devices or users. For example, in one or more embodiments the sample comprises a digital image, digital video, or other digital input corresponding to a plurality of attributes. Indeed, the bias correction system 102 can operate with regard to a variety of digital inputs that correspond to one or more sensitive data attributes.

Figure 3A:
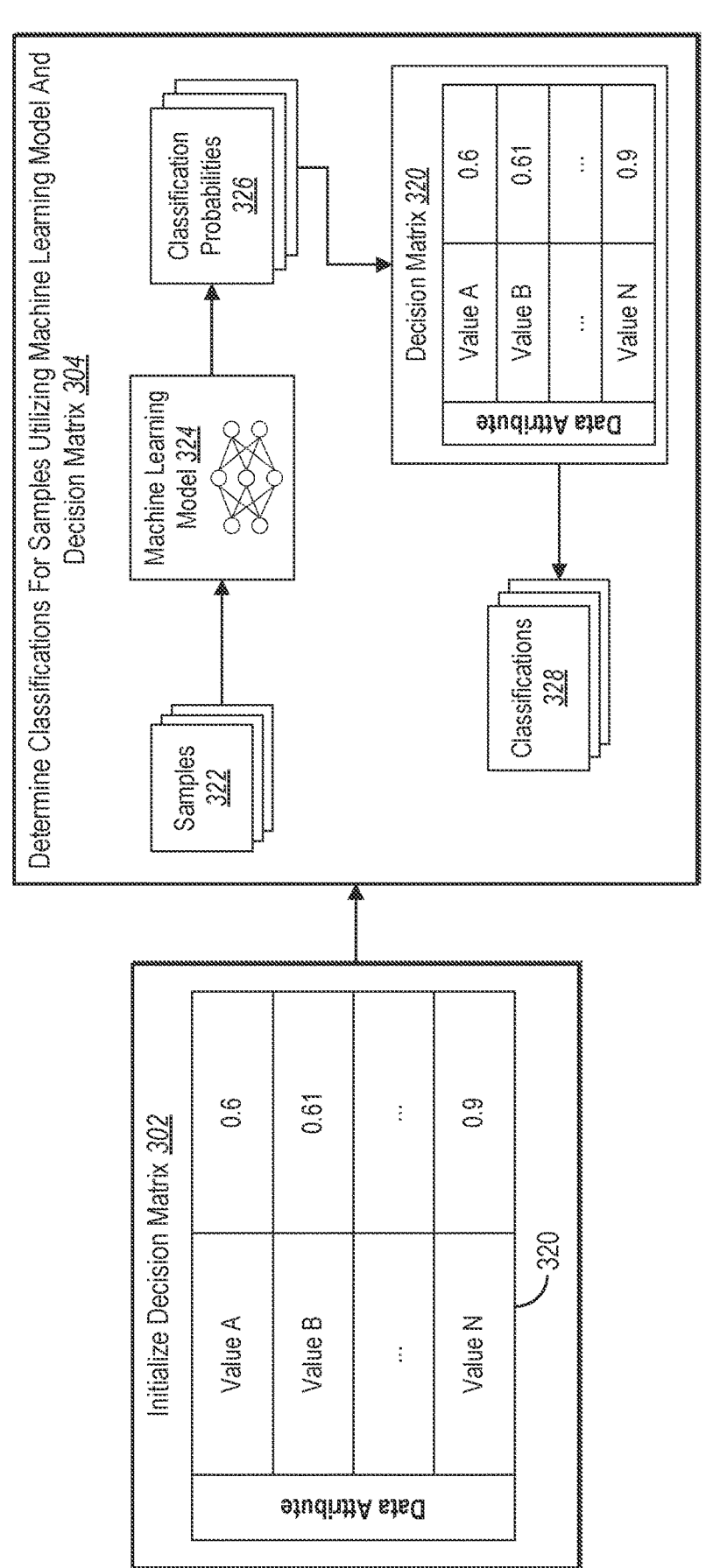
FIGS. 3A-3B illustrates a schematic diagram of determining decision thresholds of a decision matrix in accordance with one or more embodiments.
Figure 3B:
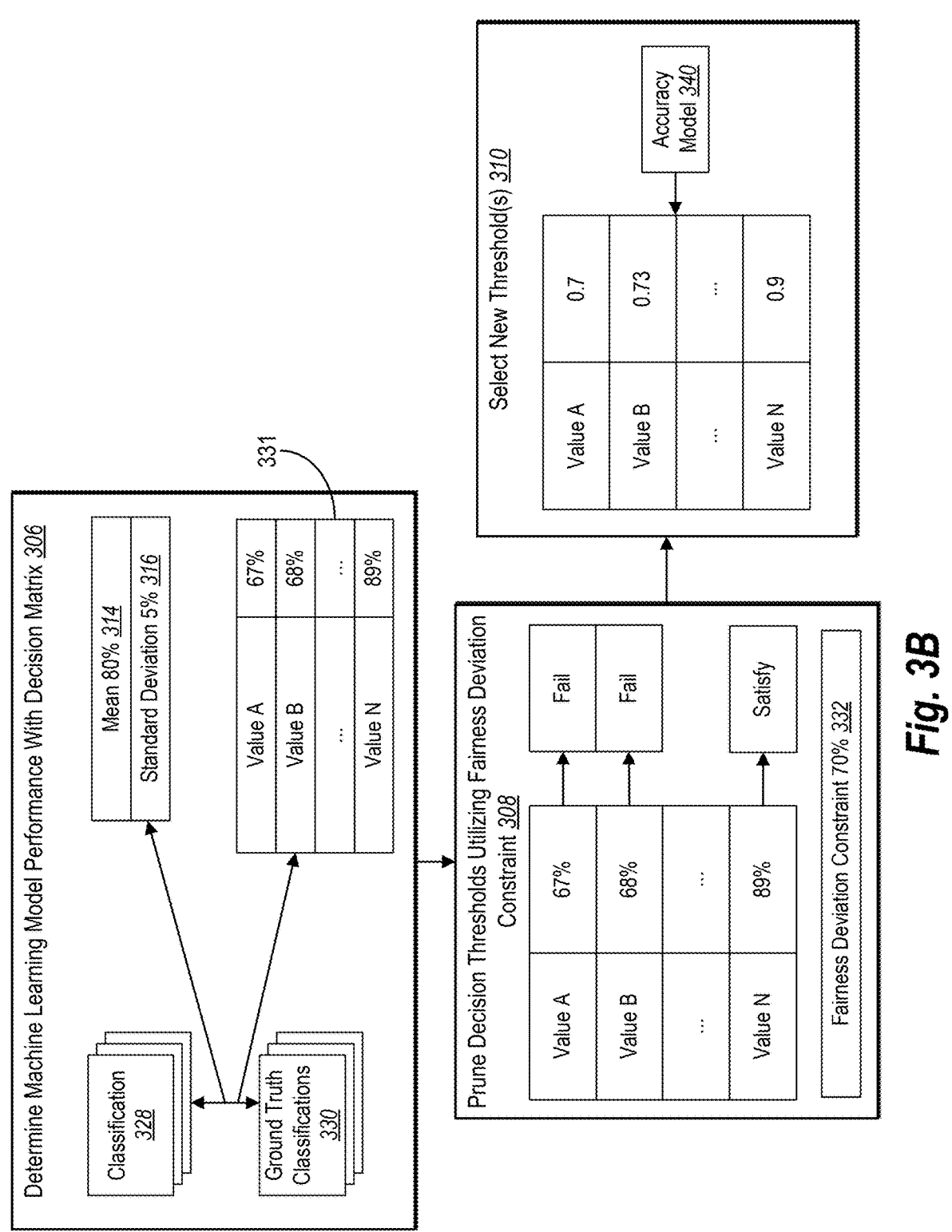

As mentioned above, in one or more implementations the bias correction system 102 iteratively modifies decision thresholds to generate a decision matrix for a machine learning model to satisfy fairness deviation constraints. FIGS. 3A-3B illustrates generating a decision matrix in accordance with one or more embodiments.

For example, FIG. 3A illustrates an act 302 of initializing a decision matrix (e.g., the decision matrix 320). As shown, for a particular data attribute, the bias correction system 102 identifies values A-N. As discussed with regard to FIG. 2, the data attribute reflects a particular category or class of data. Moreover, the values A-N reflect particular classes (e.g., subclasses), subparts, quantities, or items corresponding to the data attribute. Thus, for example, the data attribute can include an eye color data category, and the values A-N can include specific eye colors (e.g., blue, green, or brown).

In performing the act 302, the bias correction system 102 can utilize a variety of approaches to generate the initial decision threshold values. In some embodiments, the bias correction system 102 utilizes initialized values from a previous decision matrix (e.g., for a different machine learning model). In some implementations, the bias correction system 102 selects randomized values for the initial decision thresholds.

As shown in FIG. 3A, the bias correction system 102 also performs an act 304 of determining classifications for samples utilizing a machine learning model and decision matrix. In particular, the bias correction system 102 determines a plurality of samples 322. For example, each of the plurality of samples 322 include a data value corresponding to the data attribute pertinent to the decision matrix. As discussed with regard to FIG. 2, the samples 322 can include values for data attributes corresponding to client devices. In one or more embodiments, the samples 322 include historical data attributes corresponding to historical client devices. In one or more embodiments the samples 322 include training samples from a training data set for determining decision thresholds of the decision matrix.

As illustrated, the bias correction system 102 utilizes a machine learning model 324 (e.g., the machine learning model 208) to generate classification probabilities 326. Indeed, as mentioned above with regard to FIG. 2, the machine learning model 324 analyzes values of data attributes for the samples 322 and generates classification probabilities 326 for each of the samples 322.

Moreover, the bias correction system 102 utilizes the decision matrix 320 to generate classifications 328. In particular, as described with regard to FIG. 2, the bias correction system 102 compares the classification probabilities 326 with decision thresholds from the decision matrix 320 to generate the classifications 328. For example, the bias correction system 102 determines a first classification probability for a first sample having value A. The bias correction system 102 determines a first decision threshold (0.6) from the decision matrix 320 corresponding to the value A. The bias correction system 102 compares the first classification probability with the first decision threshold to generate a first classification.

The bias correction system 102 performs this approach for each of the samples 322. For example, for a second sample having value B, the bias correction system 102 determines a second classification probability. Moreover, the bias correction system 102 determines a second decision threshold (0.61) from the decision matrix 320 corresponding to the value B. The bias correction system 102 compares the second classification probability with the second decision threshold to generate a second classification. Thus, the bias correction system 102 generates a plurality of classifications utilizing the decision matrix 320 and the machine learning model 324 from the samples 322.

As shown in FIG. 3B, the bias correction system 102 also performs an act 306 of determining machine learning model performance with the decision matrix. Indeed, as illustrated, the bias correction system 102 compares the classifications 328 (generated utilizing the machine learning model 324 and the decision matrix 320) with ground truth classifications 330. The ground truth classifications 330 reflect the actual or true classification for the samples 322. By comparing the classifications 328 and the ground truth classifications 330, the bias correction system 102 determines various performance rates/metrics (e.g., a metric reflecting the performance/accuracy of a machine learning model with respect to generating predictions from samples).

For example, the bias correction system 102 determines a performance rate/metric that includes a true positive rate (e.g., the probability or rate that an actual positive sample will receive a positive classification, such as the number of true positives divided by the number of real positives) and/or a false positive rate (e.g., the probability or rate that a negative sample will receive a positive classification, such as the number of false positives divided by the number of real negatives). The bias correction system 102 can utilize a variety of additional or alternative performance/accuracy rates, such as a true negative rate (the probability or rate that a negative sample will receive a negative classification), a false negative rate (the probability or rate that a positive sample will receive a negative classification), a positive prediction value (true positives, or a positive likelihood ratio.

In addition, the bias correction system 102 also determines a mean and/or a deviation of a performance metric. For example, the bias correction system 102 determines a performance mean 314 (e.g., an average, mean, median, or mode of a performance metric for a machine learning model). The bias correction system 102 also determines a performance deviation 316 reflecting a difference, deviation, or distribution of values (e.g., a dispersion, standard deviation, average absolute deviation, medium absolute deviation, or maximum absolute deviation). Thus, for example, the performance mean 314 reflects a mean performance/accuracy with respect to a machine learning model for a data attribute. Moreover, the performance deviation 316 reflects the standard deviation (or two standard deviations) of performance/accuracy relative to the performance mean 314.

Moreover, as shown, the bias correction system 102 also determines performance rates 331 for individual values within a data attribute. For example, the bias correction system 102 determines a true positive rate or false positive rate for samples that include the value A (67%). Moreover, the bias correction system 102 determines a true positive rate or false positive rate for samples that include the value B (68%) and a true positive rate or false positive rate for samples that include the value N (89%). As mentioned above, the bias correction system 102 can utilize a variety of performance rates/metrics.

For example, consider the circumstance where $D=\{d_1, d_2, \ldots, d_k\}$ is a protected data attribute with arity K. The false positive rate for a fraud detector machine learning model F is denoted as $fpr^F=\{fpr_1^F, fpr_2^F, \ldots, fpr_k^F\}$ while the true positive rate is denoted as $tpr^F=\{tpr_1^F, tpr_2^F, \ldots, tpr_k^F\}$. For all values in the decision matrix (or grid) $G_{thresh}$, per attribute value in D, the bias correction system 102 computes model F's performance rates. Accordingly, the bias correction system 102 would have $fpr^{Fg}=\{fpr_1^{Fg}, fpr_2^{Fg}, \ldots, fpr_k^{Fg}\} \forall g \in G_{thresh}$, where $fpr^{Fg}$ is the false positive rate of the model F at threshold g across the protected attributes. Or, for true positive rate, $tpr^{Fg}=\{tpr_1^{Fg}, tpr_2^{Fg}, \ldots, tpr_k^{Fg}\} \forall g \in G_{thresh}$.

As further shown in FIG. 3B, the bias correction system 102 also performs an act 308 of pruning decision thresholds utilizing a fairness deviation constraint. In particular, the bias correction system 102 determines a fairness deviation constraint 332 and applies the fairness deviation constraint 332 to prune certain decision thresholds. For example, as shown in FIG. 3B, the bias correction system 102 determines the fairness deviation constraint 332 based on the performance mean 314 and the performance deviation 316. In particular, the bias correction system 102 combines the performance mean 314 (80%) and the performance deviation 316 (5%) to determine the fairness deviation constraint 332 (70% or 85%). Indeed, in one or more implementations the bias correction system 102 determines the fairness deviation constraint as a window of performance rates (70%-85%) based on the performance mean 314 and the fairness deviation constraint 332. Thus, in one or more embodiments, the bias correction system 102 determines the fairness deviation constraint 332 as two standard deviations from the mean with regard to a particular performance metric.

As illustrated in FIG. 3B, the bias correction system 102 applies the fairness deviation constraint 332 to the performance rates 331 for individual values within the data attribute. For example, the bias correction system 102 compares the performance rate for value A (67%) to the fairness deviation constraint 332 and determines that the performance rate fails to satisfy the fairness deviation constraint 332. Accordingly, the bias correction system 102 determines that decision threshold corresponding to value A (0.6) is failing with respect to satisfying the fairness deviation constraint 332 and prunes the decision threshold from the decision matrix 320. Similarly, the bias correction system 102 determines that the performance rate for value B (68%) and the corresponding decision threshold (0.61) fails to satisfy the fairness deviation constraint 332. Accordingly, the bias correction system 102 prunes the decision threshold for Value B from the decision matrix 320.

With regard to value N, the bias correction system 102 determines that the performance rate (89%) and corresponding decision threshold (0.9) satisfies the fairness deviation constraint (70%). Accordingly, the bias correction system 102 does not prune the decision threshold for value N from the decision matrix 320.

For example, the bias correction system 102 determines that machine learning model F satisfies the fairness deviation constraint when the false positive rate and true positive rates of the respective attribute values lie within two standard deviations of their means, i.e., $$\text{mean}(fpr^F)-2\text{std}(fpr^F) \leq fpr_i^F \leq \text{mean}(fpr^F)+2\text{std}(fpr^F) \tag{1}$$

$$\text{mean}(tpr^F)-2\text{std}(tpr^F) \leq tpr_i^F \leq \text{mean}(tpr^F)+2\text{std}(tpr^F) \tag{2}$$

where mean and std are the average and standard deviation respectively across the K attributes. The foregoing formulation captures the core philosophy of equalized odds in a high arity (e.g., $K^5$) setting—similar opportunity and similar false alarms across a sensitive attribute.

Moreover, the bias correction system 102 iteratively prunes the set of $\{fpr^{Fg} \forall g \in G_{thresh}\}$ and/or $\{tpr^{Fg} \forall g \in G_{thresh}\}$ to conform to Equation 1 and/or Equation 2. In particular, as mentioned previously, the bias correction system 102 computes $\text{mean}(fpr^{Fg})$ and $\text{std}(fpr^{Fg})$ $\{fpr^{Fg} \forall g \in G_{thresh}\}$ and/or $(tpr^{Fg})$ and $\text{std}(tpr^{Fg})$ $\{tpr^{Fg} \forall g \in G_{thresh}\}$. The bias correction system 102 then prunes $fpr_i^{Fg}$ and/or $tpr_i^{Fg}$ that violate the foregoing fairness deviation constraint. This would mean that for a protected attribute $d_i$, $D=\{d_1, d_2, \ldots, d_k\}$, some of the threshold choices are pruned because the performance rate is statistically higher than the average. Denote such pruned set as $\{fpr^{Fg}\}^{pruned}$.

As shown in FIG. 3B, the bias correction system 102 also performs an act 310 of selecting new decision thresholds. In particular, the bias correction system 102 utilizes an accuracy model 340 to select new decision thresholds for those decisions that the bias correction system 102 pruned at the act 308. For example, the bias correction system 102 applies the accuracy model 340 to value A to generate one or more accuracy scores (e.g., F0.5 score, F1 score, F2 score, or other accuracy score). Moreover, the bias correction system 102 selects a new decision threshold of 0.7 based on the accuracy score (e.g., the decision threshold with the highest F0.5, F1, F2 score, or other accuracy score). Similarly, the bias correction system 102 applies the accuracy model 340 to value B and selects a new decision threshold of 0.73.

In one or more embodiments, the accuracy model 340 includes an F beta-measure for the accuracy model 340. To illustrate, an F beta-measure can include a precision recall measure, such as $$(1 + \beta^2) \times \frac{\text{precision} \times \text{recall}}{(\beta^2 \times \text{precision}) + \text{recall}}$$

where precision is the fraction of true positive examples among the examples that the model classified as positive (true positives divided by number of false positives plus true positives) and recall is the fraction of examples classified as positive among the total number of positive samples (true positives divided by the number of trues positives plus false negatives). Similarly, an F beta measure can be expressed as follows $$(1 + \beta^2) \times \frac{(1 + \beta^2)\, tp}{(1 + \beta^2)\, tp + \beta^2\, fn + fp},$$

where tp is the number of true positives, fn is the number of false negatives, and fp is the number of false positives. For example, in one or more embodiments the accuracy model 340 includes a model that determines, improves, optimizes, or increases an F0.5, an F1, or an F2 measure (e.g., where β is 0.5, 1, or 2). In particular, in one or more embodiments the accuracy model 340 includes a model that selects a decision threshold that improves (e.g., maximizes) an F beta-measure for a data value.

For example, with regard to FIG. 3B, the bias correction system 102 analyzes the samples 322 and revisits the acts 304, 306 utilizing different decision thresholds for pruned data values. The bias correction system 102 determines a new decision threshold that improves (e.g., maximizes) an F beta-measure. The bias correction system 102 also analyzes the new decision thresholds to determine if the new decision threshold satisfies the fairness deviation constraint 332. Indeed, the bias correction system 102 determines if the new decision threshold changes the performance rate for the pertinent data value so that the performance rate satisfies the fairness deviation constraint 332. In this manner, the bias correction system 102 selects new decision thresholds (for all pruned decision thresholds) and generates a new decision matrix.

In one or more embodiments the bias correction system 102 iteratively performs the acts 304-310 until generating a decision matrix. Indeed, the bias correction system 102 determines new classifications utilizing the new decision matrix, determines new performance rates for machine learning model performance with the new decision matrix, prunes the decision thresholds, and selects new thresholds until determining that all values satisfy the fairness deviation constraint.

For example, from $\{fpr^{F_g}\}^{pruned}$ the bias correction system 102 selects the threshold per each attribute value $d_i$ where the selection metric (e.g., F1, F0.5, or F2) is maximized. This results in a choice of $\{(d_1, g_1), (d_2, g_2), \ldots (d_K, g_K)\}$. This choice of thresholds is denoted as $F_{select}$. The bias correction system 102 checks if $F_{select}$ conforms to the fairness deviation constraint. If not, the bias correction system 102 repeats the pruning and selection acts with the updated $\{fpr^{F_g}\}^{pruned}$ until the constraint is satisfied.

Notably, the final $F_{select}$ conforms to the fairness deviation constraint and preserves model fidelity by selecting the best available model based on the selection metric. In addition, the fairness heuristic only requires aggregate information about the protected attribute D and does not require information about the features (protected or unprotected) or their feature values used to train the fraud detector model. Hence, the bias correction system 102 could perform this sanitization in a differentially private manner by adding appropriate noise to the aggregate information. Third, the reliance of the output on solely the outcomes makes the fairness heuristic model agnostic. Fourth, the proposed heuristic is a one-shot search heuristic that conforms the model F to the protected attribute D rather than performing K sanitizations for each attribute of D.

Figure 4:
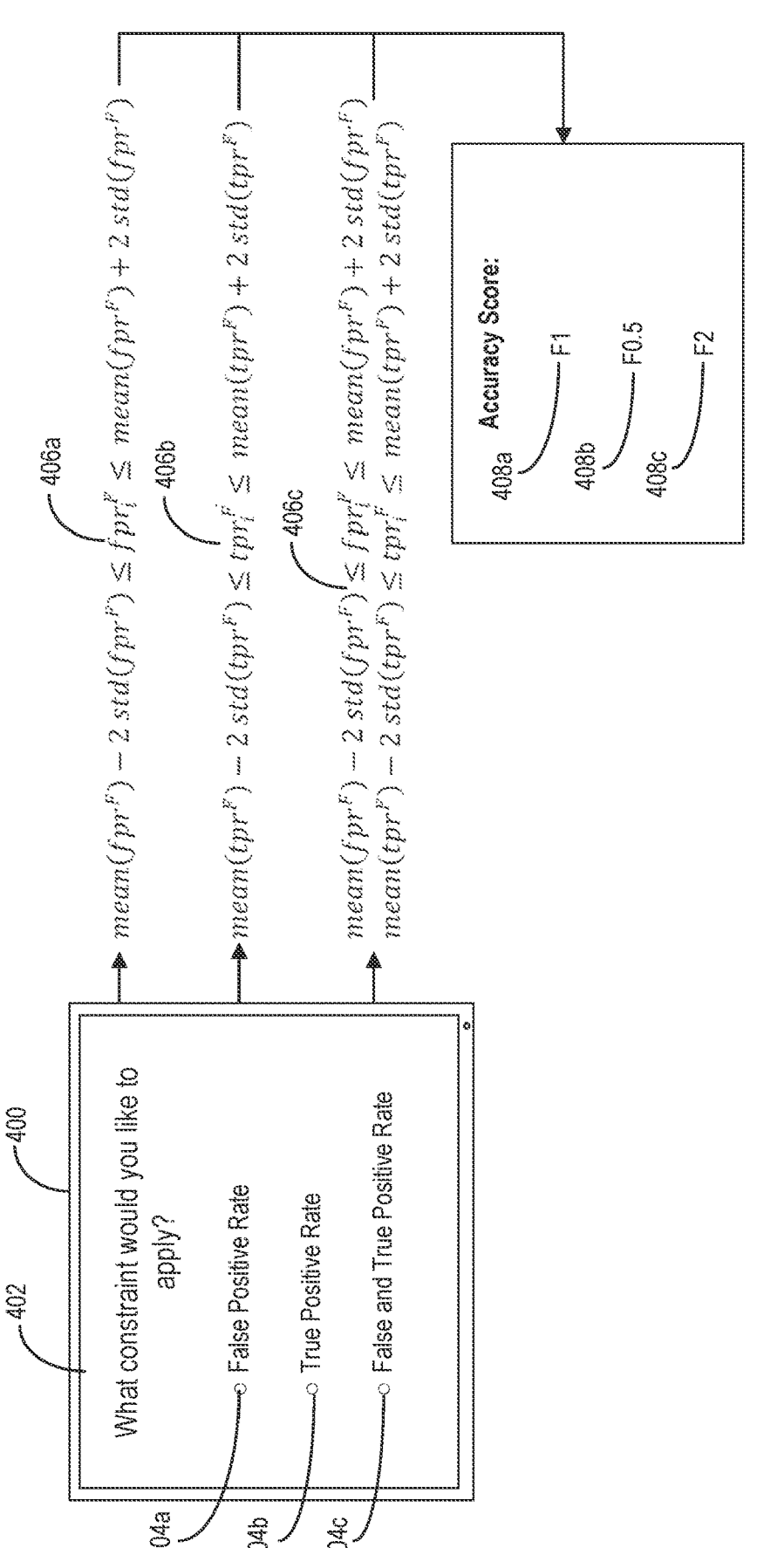
FIG. 4 illustrates a user interface for selecting fairness deviation constraints in accordance with one or more embodiments.

As mentioned above, in one or more embodiments the bias correction system 102 provides a user interface for flexible selection of parameters for fairness deviation constraints. For example, FIG. 4 illustrates a computing device 400 with a user interface 402. The user interface 402 includes fairness deviation constraint selectable elements 404a-404c. In response to one of the fairness deviation constraint selectable elements, the bias correction system 102 applies different fairness deviation constraint selectable elements 406a-406c and/or different fairness models 408a-408c. For example, in response to selection of the fairness deviation constraint selectable element 404a (for false positive rate), the bias correction system 102 utilizes the false positive fairness deviation constraint 406a (from Equation 1). In one or more embodiments, in response to selection of the fairness deviation constraint selectable element 404a, the bias correction system 102 also utilizes the accuracy model 408a (e.g., F1 measure model) to select decision thresholds (as described above in relation to FIG. 3B).

Similarly, in response to selection of the fairness deviation constraint selectable element 404b (for true positive rate), the bias correction system 102 utilizes the true positive fairness deviation constraint 406b (from Equation 2). In one or more embodiments, in applying the fairness deviation constraint 406b, the bias correction system 102 also utilizes the accuracy model 408b (e.g., F0.5 measure model).

Moreover, in response to selection of the fairness deviation constraint selectable element 404c (for both false and true positive rate), the bias correction system 102 utilizes the fairness deviation constraint 406c (Equation 1 and Equation 2 from above). In one or more embodiments, the bias correction system 102 also utilizes the accuracy model 408c (e.g., F2 measure model) upon selection of the fairness deviation constraint selectable element 404c.

Thus, the bias correction system 102 flexibly allows for selection of different fairness deviation constraints and/or accuracy models. Although FIG. 4 illustrates specific constraints, the bias correction system 102 can utilize different constraints (e.g., based on different performance rates rather than true positive rate and/or false positive rate). Moreover, the bias correction system 102 can provide other options related to the fairness deviation constraint (e.g., number of standard deviations to apply such as 1 standard deviations, 1.5 standard deviations, or 2 standard deviations).

As mentioned above, in one or more embodiments the bias correction system 102 generates deviation thresholds for multiple data attributes. In some embodiments, the bias correction system 102 determines decision thresholds that conform fairness across sub-populations originating from a single attribute (i.e., all subspaces of dimension=1). For example, the bias correction system 102 determines one-dimensional decision thresholds (for a population defined by a value of a data attribute) and then combines one-dimensional decision thresholds for multiple data attributes. This approach is described below in relation to FIGS. 5A-5B.

In some implementations, the bias correction system 102 determines decision thresholds (e.g., conforms fairness) across all possible sub-populations of the attributes and attribute values (i.e., all subspaces of dimension greater than or equal to 1). For example, in one or more embodiments, the bias correction system 102 determines a 3-dimensional sub-population of samples having US as a country, INR as a currency, and gender as a male. The bias correction system 102 then determines a multi-dimensional decision threshold that conforms fairness for this specific population. The bias correction system 102 utilizes this multi-dimensional decision threshold for samples that match the underlying values defining the sub-population. This approach is described below in relation to FIG. 6

Figure 5A:
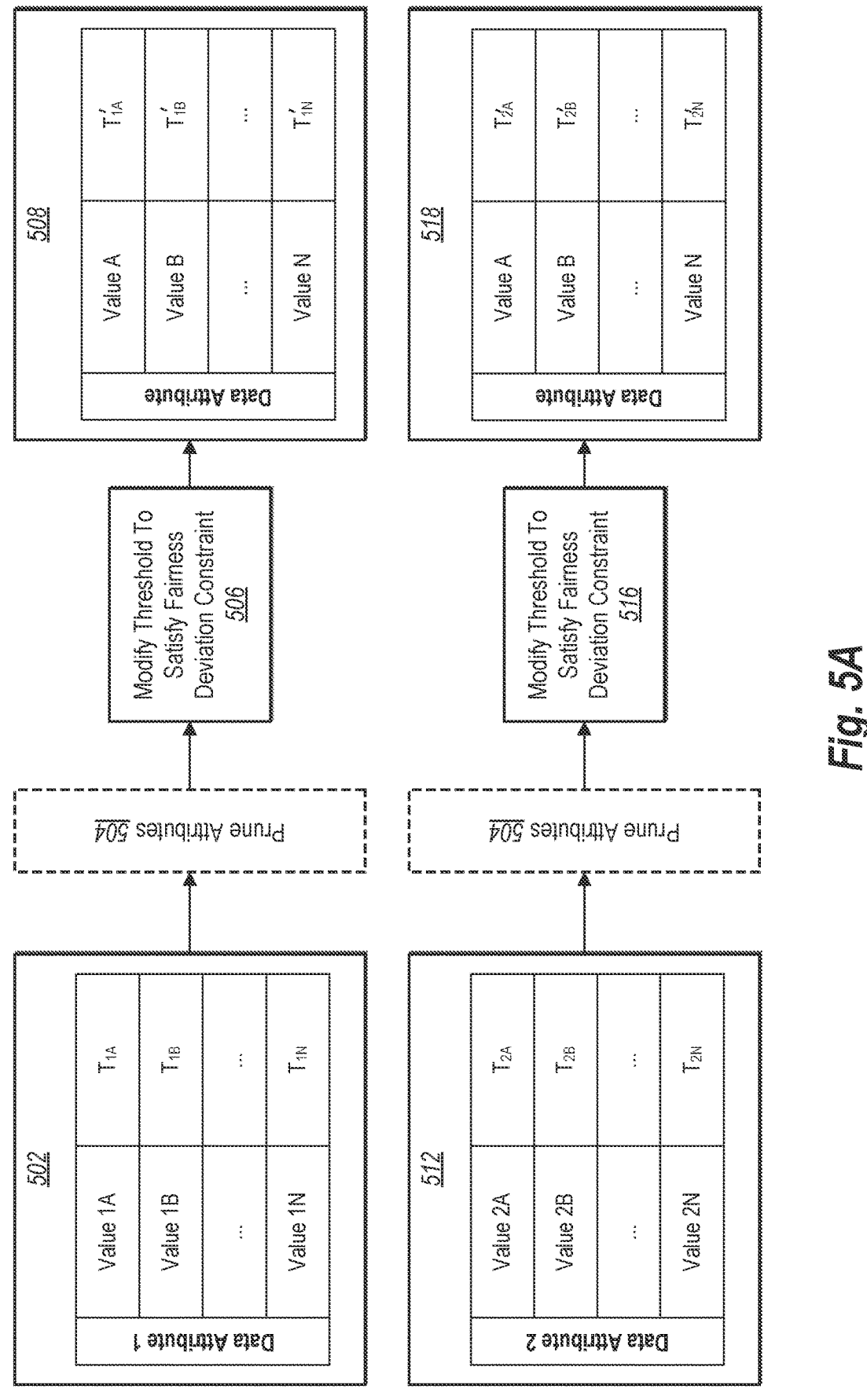
FIGS. 5A-5B illustrate a schematic diagram of determining a decision threshold corresponding to multiple data attributes by combining one-dimensional decision thresholds in accordance with one or more embodiments.

For example, as shown in FIG. 5A, the bias correction system 102 analyzes data attribute 1 that includes values 1A-1N (e.g., a country attribute with multiple specific country values). Similarly, the bias correction system 102 analyzes data attribute 2 that includes values 2A-2N (e.g., a height attribute with multiple specific height ranges). The bias correction system 102 selects decision thresholds such that the machine learning model will conform to the fairness deviation constraints for each individual attribute. The bias correction system 102 then combines these decision thresholds for application to multiple sensitive data attributes.

As shown in FIG. 5A, the bias correction system 102 determines an initial decision matrix 502 including initial decision thresholds T1A-T1N. Similarly, the bias correction system 102 determines an initial decision matrix 512 including initial decision thresholds T2A-T2N. In one or more embodiments, the bias correction system 102 performs an act 504 of pruning data attributes. In particular, (either before or after initialization of the decision matrices 502, 512) the bias correction system 102 removes data attributes to reduce computational resources.

For example, the bias correction system 102 prunes data attributes that satisfy a dependency metric (e.g., that capture/cover similar sub-populations). In one or more embodiments, the bias correction system 102 determines a dependency (e.g., dependency metric) between attributes as the Chi-square statistic between pairs of data attributes. Based on this statistic, the bias correction system 102 computes the p-value to infer if two data attributes are statistically independent of each other (p-value<=0.01) and drop (one or both) of the attributes that are highly dependent. This act prunes the space of protected attributes while only leaving independent attributes to calibrate. The bias correction system 102 can utilize a variety of dependence metrics (e.g., Jacard similarity or other dependency metrics) to prune similar data attributes.

As further shown in FIG. 5A, the bias correction system 102 performs acts 506, 516 of modifying design threshold to satisfy a fairness deviation constraint. In particular, the bias correction system 102 performs the act 506 by modifying the design thresholds for the decision matrix 502 so that a corresponding machine learning model satisfies the fairness deviation constraint for the individual values 1A-1N of data attribute 1. Similarly, the bias correction system 102 performs the act 516 by modifying the design thresholds for the decision matrix 512 so that the machine learning model satisfies the fairness deviation constraint for the individual values 2A-2N of data attribute 2. As shown, this results in a modified decision matrix 508 that includes modified thresholds T'1A-T' 1N and a modified decision matrix 518 that includes modified thresholds T'2A-T'2N.

Figure 5B:
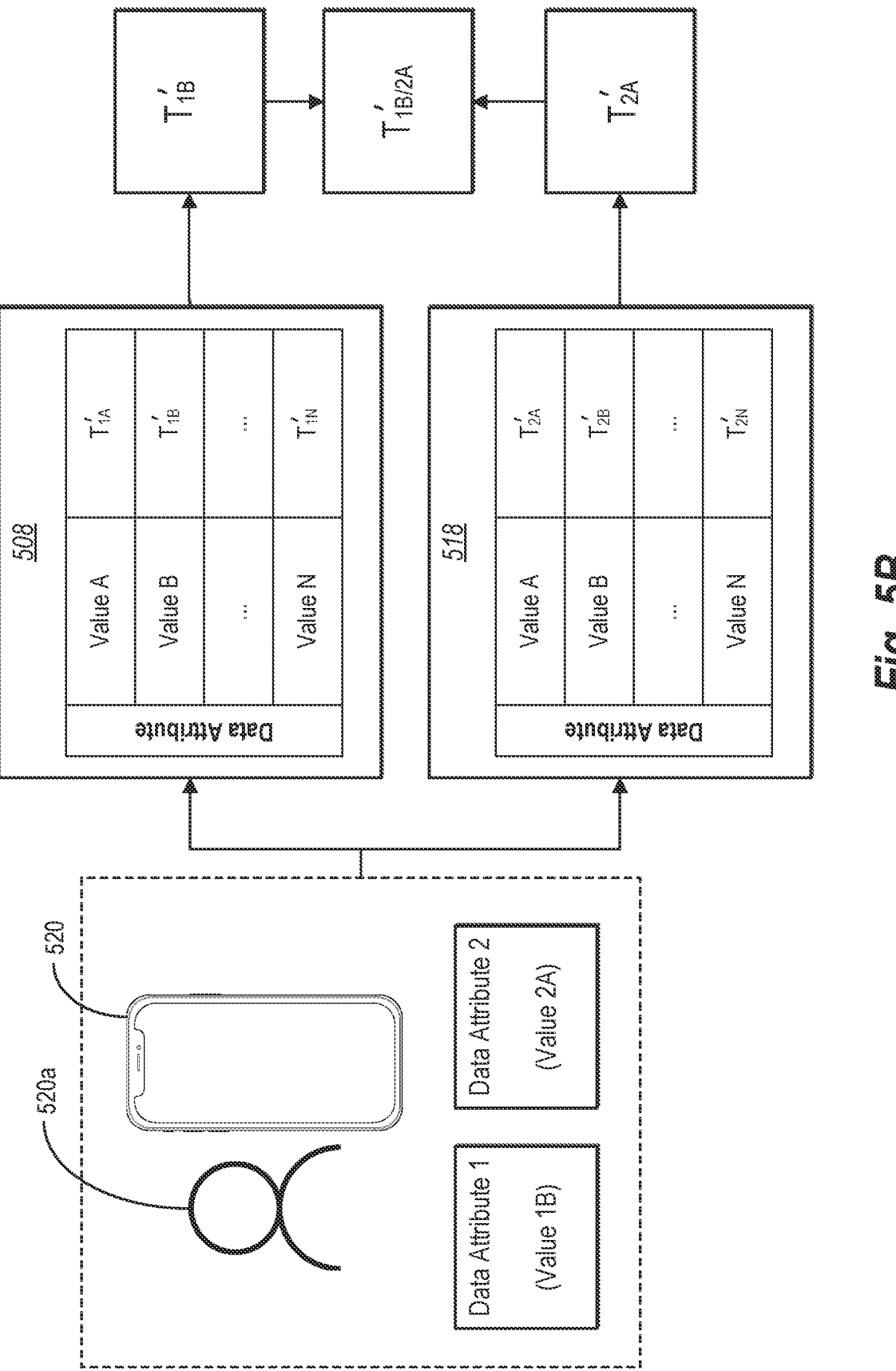

In one or more embodiments, the bias correction system 102 determines a decision threshold for a sub-population defined by multiple values from multiple data attributes by combining design thresholds for individual values. To illustrate, FIG. 5B illustrates a sample corresponding to a client device 520 (and user 520a). The bias correction system 102 determines that client device 520 and/or user 520a have value 1B (with regard to data attribute 1) and value 2B (with regard to data attribute 2).

In response, the bias correction system 102 accesses the modified decision matrices 508, 518. From the modified decision thresholds in the modified decision matrices 508, 518, the bias correction system 102 identifies the decision thresholds T'1B and T'2A (i.e., the decision thresholds corresponding to value 1B and value 2B). Moreover, the bias correction system 102 combines the decision thresholds T'1B and T'2A. In one or more embodiments, the bias correction system 102 combines the decision thresholds T'1B and T'2A by averaging. The bias correction system 102 can utilize a variety of approaches to combine these values (e.g., weighted average based on number of samples corresponding to the data values, adding, or multiplying).

As shown, in this manner the bias correction system 102 generates a sub-population decision threshold T'1B/2A. In one or more embodiments, the bias correction system 102 utilizes this sub-population decision threshold in generating sanitized predictions for the client device 520 and future samples belonging to the sub-population that includes value 1B and value 2A (as described in greater detail with regard to FIG. 7).

Although FIGS. 5A-5B illustrate two different data attributes, in one or more embodiments the bias correction system 102 operates with higher arity data attributes. For example, the bias correction system 102 can determine decision thresholds for data attributes with 5, 50, 100 or more values.

Figure 6:
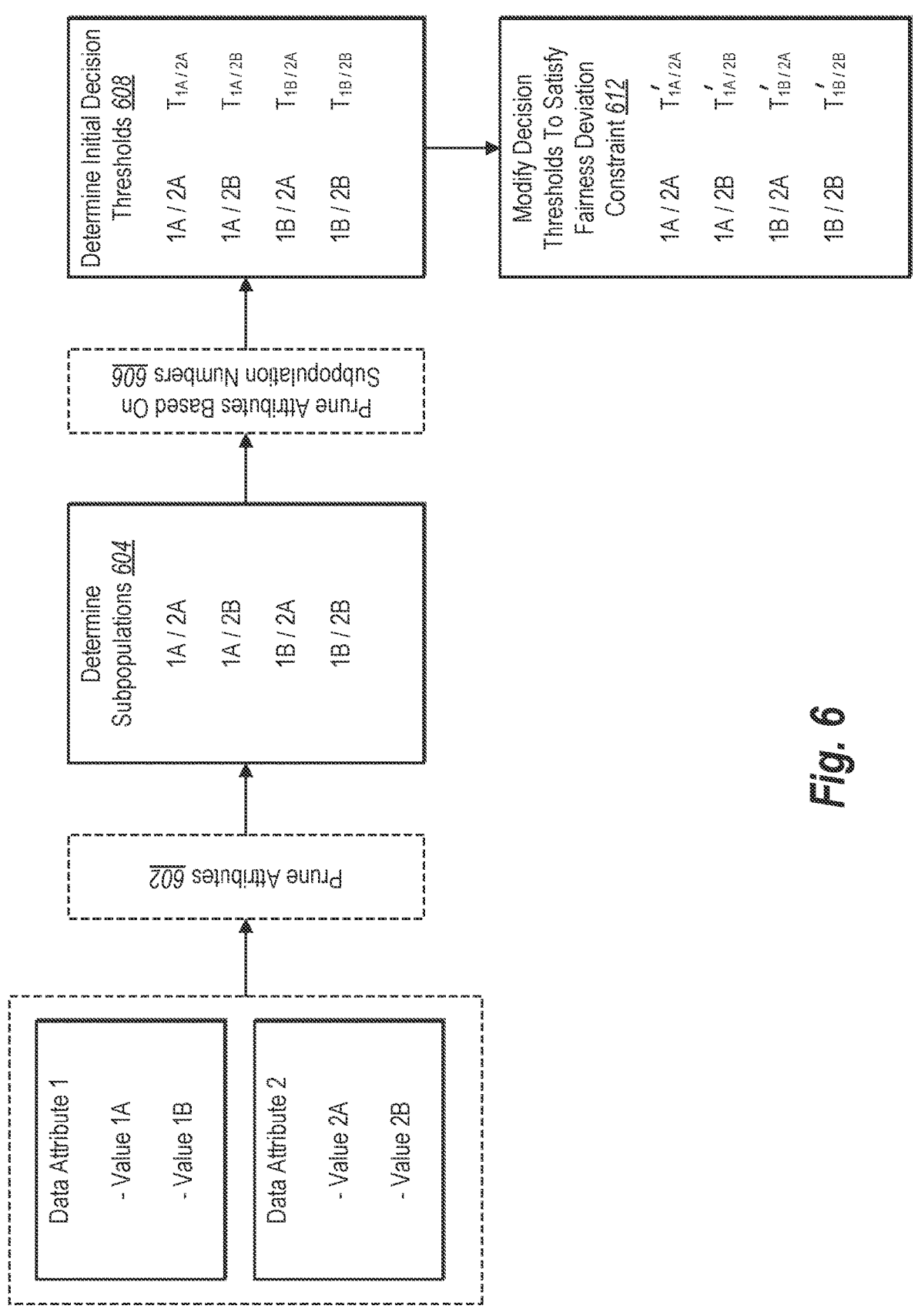
FIG. 6 illustrates a schematic diagram of determining multi-dimensional decision thresholds corresponding to multiple data attributes in accordance with one or more embodiments.

As mentioned previously, in one or more embodiments the bias correction system 102 conforms fairness of the machine learning model for multi-dimensional populations. In particular, the bias correction system 102 learns multi-dimensional decision thresholds for sub-populations individually (e.g., rather than combining one-dimensional thresholds for values of different data attributes). For example, FIG. 6 illustrates data attribute 1 (having values 1A and value 1B) and data attribute 2 (having value 2A and value 2B). Although data attribute 1 and data attribute 2 are shown as including only two values each, this low rarity example is for ease of illustration purposes. In one or more embodiments, the bias correction system 102 operates with regard to data attributes having 5, 50, 100 or more different values.

Notably, in such high arity circumstances, model complexity significantly increases. Indeed, for m protected data attributes, with cardinalities $K_1, K_2, \ldots K_m$, the number of subspaces for calibration would be $K_1 \times K_2 \times \ldots K_m$. Accordingly, as described above, in one or more embodiments the bias correction system 102 performs an act 602 of pruning these data attributes to remove data attributes with similar populations. Moreover, the bias correction system 102 performs an act 604 of determining sub-populations. As shown, the bias correction system 102 determines sub-populations defined by the intersection of the various values across the data attributes. In particular, the bias correction system 102 determines a sub-population having value 1A and value 2A, a sub-population having value 1A and value 2B, a sub-population having value 1B and value 2A, and a sub-population having value 1B and value 2B.

Moreover, as illustrated, the bias correction system 102 also performs an act 606 of pruning attributes based on sub-population numbers (e.g., based on a number of samples reflecting the sup-population). For example, the bias correction system 102 determines a number of samples (from a plurality of samples, such as the samples 322) that have values aligning with the defining values for the sub-population. The bias correction system 102 then prunes those sub-populations based on the number of samples (e.g., by comparing the number of samples to a threshold number). In particular, in one or more embodiments the bias correction system 102 prunes sub-populations that fail to have a threshold number of samples. For example, the bias correction system 102 removes sub-populations that have fewer than 100 samples.

As illustrated, the bias correction system 102 performs an act 608 of determining initial decision thresholds. Rather than identifying initial decision thresholds for individual values, the bias correction system 102 determines initial decision thresholds for sub-populations defined by multiple values. Thus, for example, the bias correction system 102 determines an initial decision threshold T1A/2A for the sub-population having the value 1A and the value 2A. Similarly, the bias correction system 102 determines an initial decision threshold T1A/2B for the sub-population having the value 1A and the value 2B (and so on for the remaining sub-populations).

The bias correction system 102 then performs an act 612 of modifying the decision thresholds for each sub-population to satisfy the fairness deviation constraint. Indeed, as discussed above (e.g., with regard to FIGS. 3A-3B), the bias correction system 102 determines classifications for sub-population samples utilizing a machine learning model and the decision matrix, determines machine learning model performance metrics for the sub-populations with the decision matrix, prunes decision thresholds for sub-populations utilizing the fairness deviation constraint, and selects new thresholds for the sub-populations (utilizing an accuracy model). For example, the bias correction system 102 can determine, utilizing the decision matrix and the predicted classification probabilities, that the machine learning model fails to satisfy the fairness deviation constraint with respect to a particular subpopulation. In response, the bias correction system 102 selects a modified decision threshold for the sub-population (utilizing the accuracy model) to generate the modified decision matrix.

Thus, the bias correction system 102 iteratively determines decision thresholds for each of the (unpruned) multi-dimensional sub-populations. In one or more implementations, the bias correction system 102 utilizes these decision thresholds in response to identifying a future sample that belongs to any particular sub-population.

Figure 7:
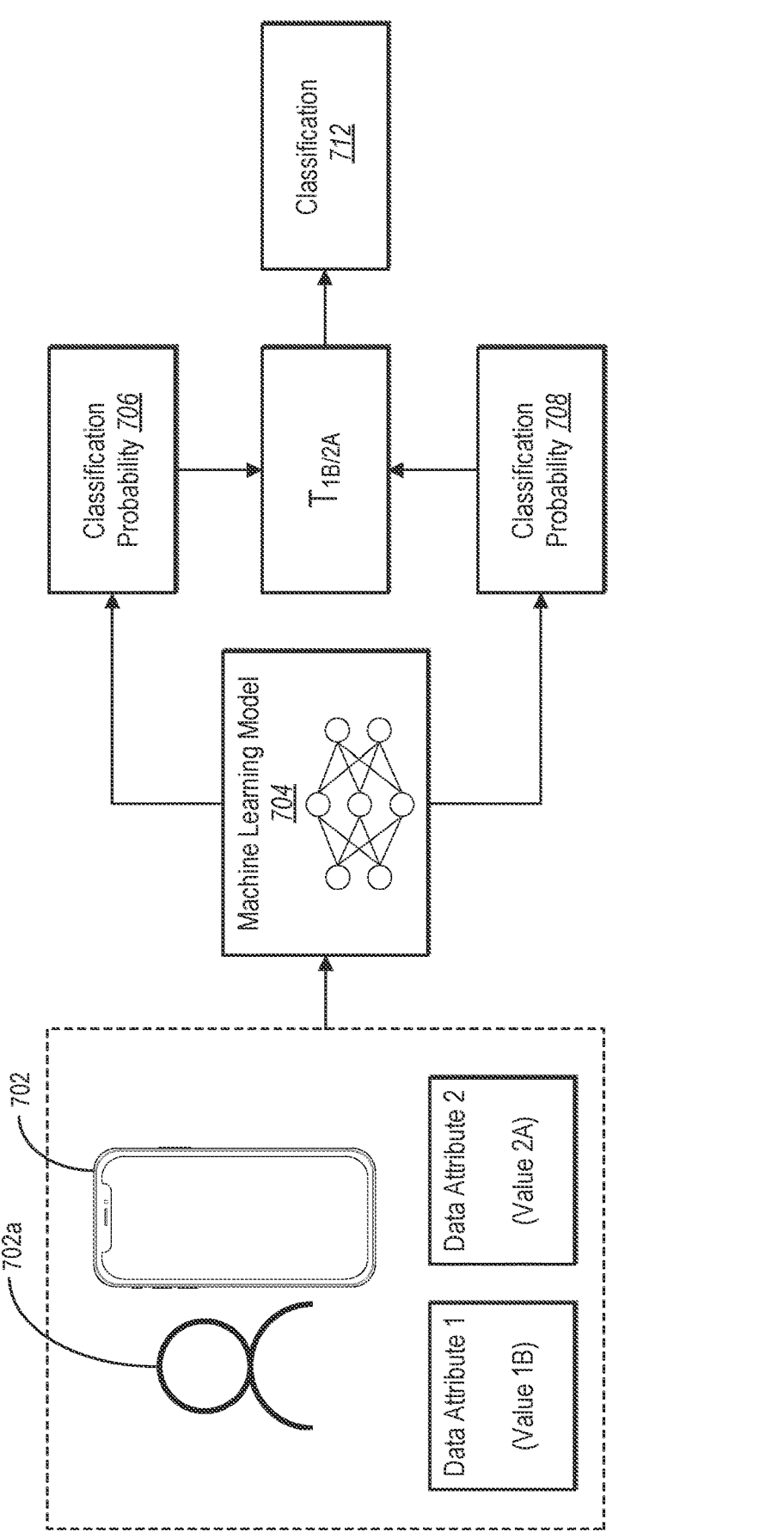
FIG. 7 illustrates a schematic diagram of generating a predicted classification utilizing a decision threshold corresponding to multiple data attributes in accordance with one or more embodiments.

For example, FIG. 7 illustrates a new sample that includes a client device 702 and a user 702a. As shown, the bias correction system 102 determines that the client device 702 corresponds to value 1B (for data attribute 1) and value 2B (for data attribute 2). The bias correction system 102 utilizes the machine learning model 704 to generate classification probabilities 706, 708. The bias correction system 102 then selects the particular decision threshold T1B/2A that corresponds to the sub-population defined by the value 1B and the value 2A.

Specifically, with regard to FIG. 5B, the bias correction system 102 selects the T'1B/2A, generated by combining T'1B and T'2A. Moreover, with regard to FIG. 6, the bias correction system 102 access the modified decision matrix generated at the act 612 and extracts the decision threshold T'1B/2A learned for this specific multi-dimensional population.

As illustrated, in FIG. 7, the bias correction system 102 utilizes the decision threshold T1B/2A to generate a classification 712. In particular, the bias correction system 102 compares the classification probabilities 706, 708 to the decision threshold T1B/2A and generates the classification 712.

Figure 8:
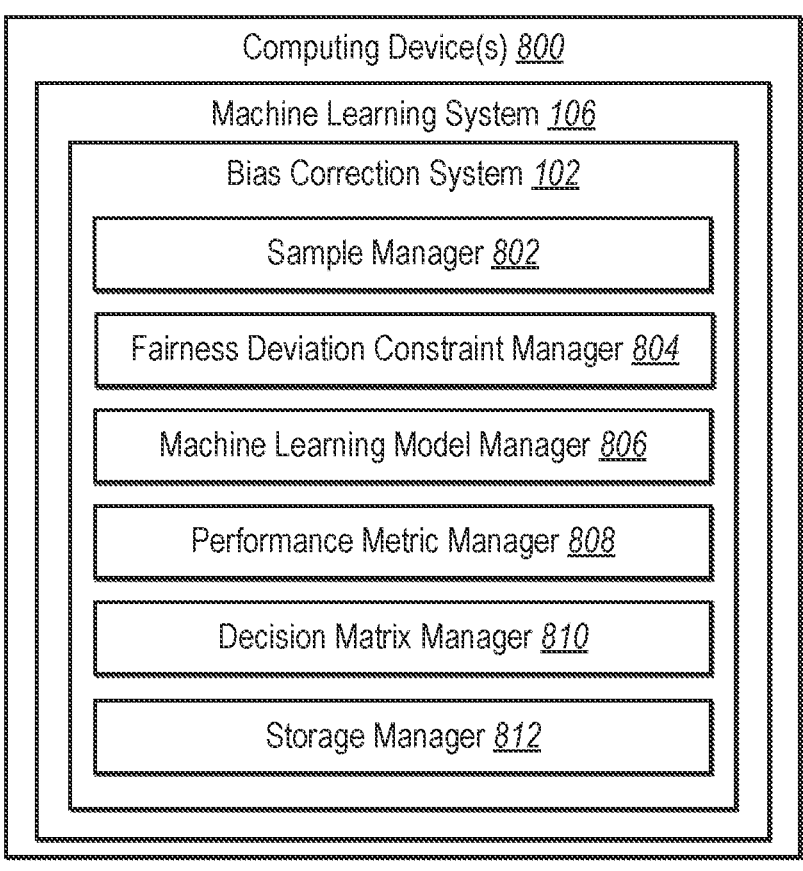
FIG. 8 illustrates a schematic diagram of a bias correction system in accordance with one or more embodiments.

Looking now to FIG. 8, additional detail will be provided regarding components and capabilities of the bias correction system 102. Specifically, FIG. 8 illustrates an example schematic diagram of the bias correction system 102 on an example computing device 800 (e.g., one or more of the client device 112 and/or the server(s) 104). As shown in FIG. 8, the bias correction system 102 includes a sample manager 802, a fairness deviation constraint manager 804, a machine learning model manager 806, a performance metric manager 808, a decision matrix manager 810, and a storage manager 812.

As just mentioned, the bias correction system 102 includes the sample manager 802. The sample manager 802 can identify, collect, monitor, and/or retrieve samples including values corresponding to various data attributes. For example, the sample manager 802 can monitor user interactions or user profiles to determine values of data attributes. Similarly, the sample manager 802 can extract values for data attributes (e.g., values indicating a client device type or features of a digital image). The sample manager 802 can also identify new samples (e.g., new client devices seeking to access digital information).

As shown in FIG. 8, the bias correction system 102 also includes the fairness deviation constraint manager 804. The fairness deviation constraint manager 804 can identify, create, generate, determine, apply, implement, and/or utilize one or more fairness deviation constraints. For example, as discussed above, the fairness deviation constraint manager 804 can generate fairness deviation constraint based on a performance mean and a performance deviation. The fairness deviation constraint manager 804 can also provide one or more graphical user interfaces with one or more user interface elements for selecting a fairness deviation constraint (or constraint parameters).

As further illustrated in FIG. 8, the bias correction system 102 also includes the machine learning model manager 806. The machine learning model manager 806 can train, generate, apply, and/or utilize a machine learning model. For example, as discussed above, the machine learning model manager 806 can utilize a machine learning model to generate a prediction based on a sample. Specifically, in one or more implementations the machine learning model manager 806 generates classification predictions based on values for sensitive data attributes.

Moreover, as shown, the bias correction system 102 can include the performance metric manager 808. The performance metric manager 808 can generate, determine, identify and/or provide one or more performance metrics (e.g., performance rates) for a machine learning model. For example, the performance metric manager 808 can generate and provide true positive rate and/or false positive rate for a machine learning model with respect to samples comprising a particular value for a data attribute. Similarly, the performance metric manager 808 can determine performance means, performance deviations, or other metrics for a machine learning model with regard to a data attribute.

The bias correction system 102 can also include the decision matrix manager 810. The decision matrix manager 810 can generate, determine, identify, learn, create, utilize, implement, and/or apply a decision matrix. For example, as described above the decision matrix manager 810 can generate a decision matrix that includes decision thresholds for particular values of data attributes to cause a machine learning model to satisfy a fairness deviation constraint. Moreover, the decision matrix manager 810 can apply a decision matrix to classification probabilities of a machine learning model to generate sanitized classifications.

In addition, as illustrated in FIG. 8, the bias correction system 102 can also include the storage manager 812. The storage manager 812 can include one or more memory devices for storing information related to the bias correction system 102. For instance, the storage manager 812 can store, recall, and/or maintain historical samples, data attributes and corresponding values, predicted classifications, ground truth classifications, decision matrices, performance rates/metrics, machine learning models (e.g., learned parameters of machine learning models), and/or fairness deviation constraints.

In one or more embodiments, each of the components of the bias correction system 102 are in communication with one another using any suitable communication technologies. Additionally, the components of the bias correction system 102 are in communication with one or more other devices including one or more client devices described above. It will be recognized that although the components of the bias correction system 102 are shown to be separate in FIG. 8, any of the subcomponents may be combined into fewer components, such as into a single component, or divided into more components as may serve a particular implementation. Furthermore, although the components of FIG. 8 are described in connection with the bias correction system 102, at least some of the components for performing operations in conjunction with the bias correction system 102 described herein may be implemented on other devices within the environment.

The components of the bias correction system 102 can include software, hardware, or both. For example, the components of the bias correction system 102 can include one or more instructions stored on a computer-readable storage medium and executable by processors (or at least one processor) of one or more processing devices/computing devices (e.g., the computing device 800). When executed by the one or more processors, the computer-executable instructions of the bias correction system 102 can cause the computing device 800 to perform the methods described herein. Alternatively, the components of the bias correction system 102 can comprise hardware, such as a special purpose processing device to perform a certain function or group of functions. Additionally, or alternatively, the components of the bias correction system 102 can include a combination of computer-executable instructions and hardware.

Furthermore, the components of the bias correction system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the bias correction system 102 may be implemented as part of a stand-alone application on a personal computing device or a mobile device. Alternatively, or additionally, the components of the bias correction system

102 may be implemented in any application for displaying, modifying, or identifying digital content, including, but not limited to ADOBE CONTENT CLOUD, ADOBE DOCUMENT CLOUD, ADOBE ADVERTISING CLOUD, ADOBE and/or ADOBE CREATIVE CLOUD. The foregoing are either registered trademarks or trademarks of Adobe Inc. in the United States and/or other countries.

FIGS. 1-8 the corresponding text, and the examples provide a number of different systems, methods, and non-transitory computer readable media for generating enhanced digital images from burst digital images. In addition to the foregoing, embodiments can also be described in terms of flowcharts comprising acts for accomplishing a particular result. For example, FIG. 9 illustrates a flowchart of an example sequence or series of acts for generating a decision matrix for a machine learning model to satisfy a fairness deviation constraint in accordance with one or more embodiments.

Figure 9:
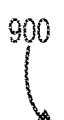
FIG. 9 illustrates a flowchart of a series of acts for generating a decision matrix for a machine learning model to satisfy a fairness deviation constraint in accordance with one or more embodiments.
Figure 9:
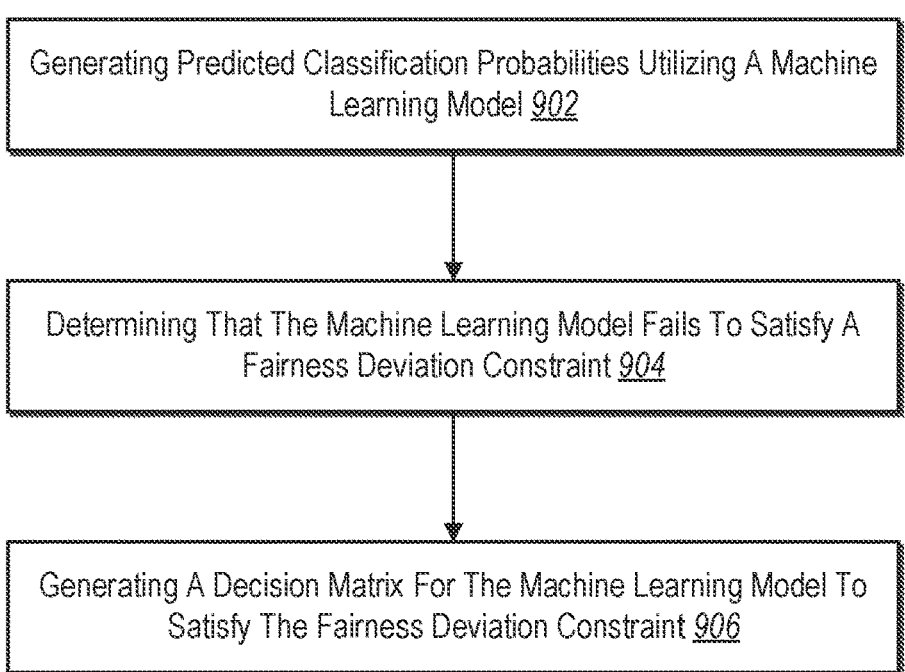

While FIG. 9 illustrates specific acts according to particular embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 that includes an act 902 of generating predicted classification probabilities utilizing a machine learning model. For example, in one or more implementations the act 902 includes generating, utilizing a machine learning model, predicted classification probabilities from a plurality of samples comprising a plurality of values for a data attribute.

In addition, as shown in FIG. 9 the series of acts 900 includes an act 904 of determining that the machine learning model fails to satisfy a fairness deviation constraint. For example, in one or more implementations the act 904 includes determining, utilizing decision matrix the predicted classification probabilities and a decision matrix comprising a plurality of decision thresholds corresponding to the plurality of values, that the machine learning model fails to satisfy a fairness deviation constraint with respect to a value of the data attribute.

In one or more embodiments the act 904 includes determining the fairness deviation constraint by: determining a performance mean and a performance deviation of the machine learning model with respect to the data attribute; and determining the fairness deviation constraint utilizing the performance mean and the performance deviation of the machine learning model with respect to the data attribute.

For example, the act 904 can include determining a mean and a deviation for a performance metric of the machine learning model with respect to the data attribute; and determining the fairness deviation constraint by identifying a window of performance rates defined by the deviation relative to the mean.

In addition, in some embodiments, the act 904 includes generating predicted classifications by comparing a set of the predicted classification probabilities with a decision threshold corresponding to the value from the decision matrix; determining a performance rate by comparing the predicted classifications with ground truth classifications; and determining that the performance rate fails to satisfy the fairness deviation constraint.

For example, in one or more embodiments, the act 904 includes determining a performance rate of the machine learning model with respect to the value; and determining that the performance rate falls outside of the window of performance rates defined by the performance deviation relative to the performance mean. Furthermore, determining the performance rate can include generating predicted classifications by comparing a set of the predicted classification probabilities with a decision threshold corresponding to the value from the decision matrix; and comparing the predicted classifications with ground truth classifications.

In one or more embodiments, the act 904 includes determining a true positive rate or a false positive rate of the machine learning model with respect to the value; and determining that the true positive rate or the false positive rate fails to satisfy the fairness deviation constraint.

In some implementations, the act 904 includes determining the fairness deviation constraint by identifying user selection of a true positive fairness deviation constraint or a false positive fairness deviation constraint.

Moreover, FIG. 9 shows that the series of acts 900 also includes an act 906 of generating a decision matrix for the machine learning model to satisfy the fairness deviation constraint. For example, in one or more implementations the act 906 includes selecting a modified decision threshold for the value of the data attribute to generate a modified decision matrix for the machine learning model; and applying the modified decision matrix to one or more predicted classification probabilities of the machine learning model to generate one or more classifications that satisfy the fairness deviation constraint. Thus, the act 906 can include applying the modified decision matrix to the predicted classification probabilities to generate a set of classifications that satisfy the fairness deviation constraint. The act 906 can also include applying the modified decision matrix to a new set of predicted classifications probabilities to generate a set of classifications that satisfy the fairness deviation constraint.

For example, in one or more embodiments, the act 906 includes selecting the modified decision threshold by determining, utilizing an accuracy model, an accuracy score corresponding to the modified decision threshold for the value; and selecting the modified decision threshold based on the accuracy score. In some implementations, the act 906 includes selecting the modified decision threshold utilizing a precision-recall model.

In one or more embodiments, the series of acts 900 also includes providing, for display via a user interface of a client device, a first selectable option corresponding to a true positive fairness deviation constraint and a second selectable option corresponding to a false positive deviation constraint; and determining the fairness deviation constraint based on identifying a user interaction with the first selectable option or the second selectable option.

Moreover, in some implementations, the series of acts 900 includes determining, utilizing the modified decision matrix and the predicted classification probabilities, that the machine learning model fails to satisfy the fairness deviation constraint with respect to an additional value of the data attribute; and generating the modified decision matrix for the machine learning model to satisfy the fairness deviation constraint be selecting an additional modified decision threshold for the additional value.

In some implementations, the plurality of samples comprise an additional plurality of values corresponding to an additional data attribute. Moreover, in one or more embodiments the series of acts 900 include determining, utilizing the decision matrix and the predicted classification probabilities, that the machine learning model fails to satisfy a fairness deviation constraint with respect to an additional value of the additional data attribute; and generating the modified decision matrix for the machine learning model by selecting an additional modified decision threshold for the additional value. In some implementations the series of acts 900 includes determining a dependency between the data attribute and the additional attribute; and pruning decision thresholds corresponding to the additional data attribute based on the dependency.

In addition, in one or more embodiments, the plurality of samples comprise an additional plurality of values corresponding to an additional data attribute and the series of acts 900 includes determining a sub-population comprising the value of the data attribute and comprising an additional value of the additional data attribute; determining, utilizing the decision matrix and the predicted classification probabilities, that the machine learning model fails to satisfy the fairness deviation constraint with respect to the sub-population; and generating the modified decision matrix by selecting the modified decision threshold for the sub-population.

Moreover, in one or more embodiments, the series of acts 900 includes determining a sub-population comprising the value of the data attribute and comprising an additional value of the additional data attribute; determining a number of samples from the plurality of samples corresponding to the sub-population; and pruning decision thresholds corresponding to the sub-population based on the number of samples.

Figure 10:
FIG. 10 illustrates a flowchart of a series of acts for utilizing a decision matrix and a machine learning model to generate a sanitized classification in accordance with one or more embodiments.
Figure 10:
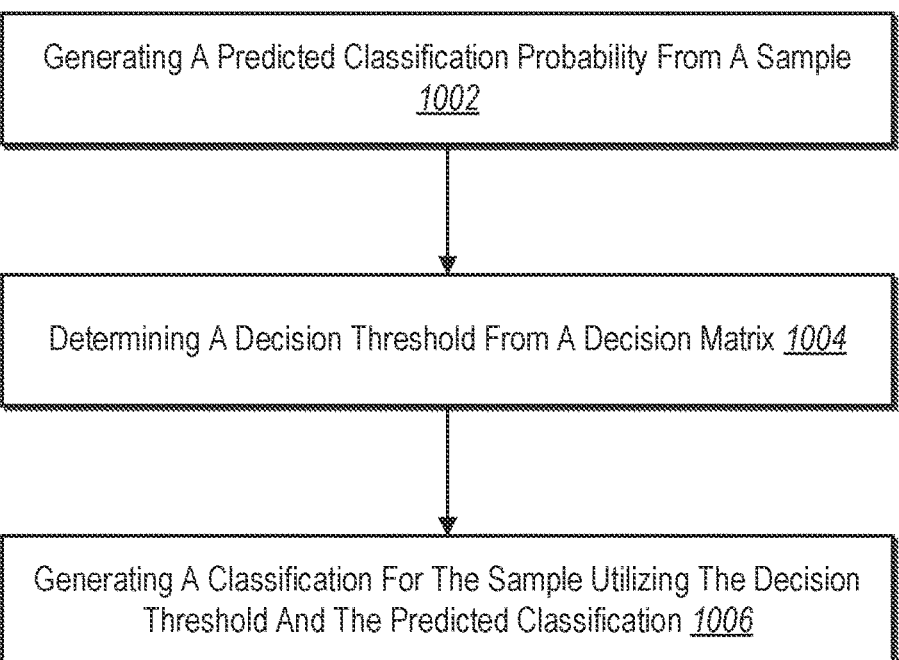

In addition, FIG. 10 illustrates a flowchart of an example sequence or series of acts for utilizing a decision matrix and a machine learning model to generate a sanitized classification in accordance with one or more embodiments.

While FIG. 10 illustrates specific acts according to particular embodiments, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 that includes an act 1002 of generating a predicted classification probability from a sample. For example, in one or more embodiments the act 1002 includes generating, utilizing a machine learning model, a predicted classification probability from a sample, wherein the sample belongs to a first value of a first protected data attribute and a second value of a second protected data attribute In addition, as shown in FIG. 10 the series of acts 1000 includes an act 1004 of determining a decision threshold (e.g., threshold probability) from a decision matrix. For example, in one or more embodiments the act 1004 includes determining, via a decision matrix, a decision threshold corresponding to the first value of the first protected data attribute and the second value of the second protected data attribute.

Moreover, FIG. 10 shows that the series of acts 1000 also includes an act 1006 of generating a classification for the sample utilizing the decision threshold and the predicted classification. For example, in one or more implementations the act 1006 includes generating a classification for the sample by comparing the predicted classification probability from the machine learning model and the decision threshold corresponding to the first value of the first protected data attribute and the second value of the second protected data attribute.

In some circumstances, the act 1006 includes generating a negative classification in response to determining that the predicted classification probability from the machine learning model fails to satisfy the decision threshold corresponding to the first value and the second value.

In one or more embodiments, the series of acts 1000 includes determining a first decision threshold corresponding to the first value from the decision matrix; determining a second decision threshold corresponding to the second value from the decision matrix; and determining the threshold probability by combining the first decision threshold and the second decision threshold.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
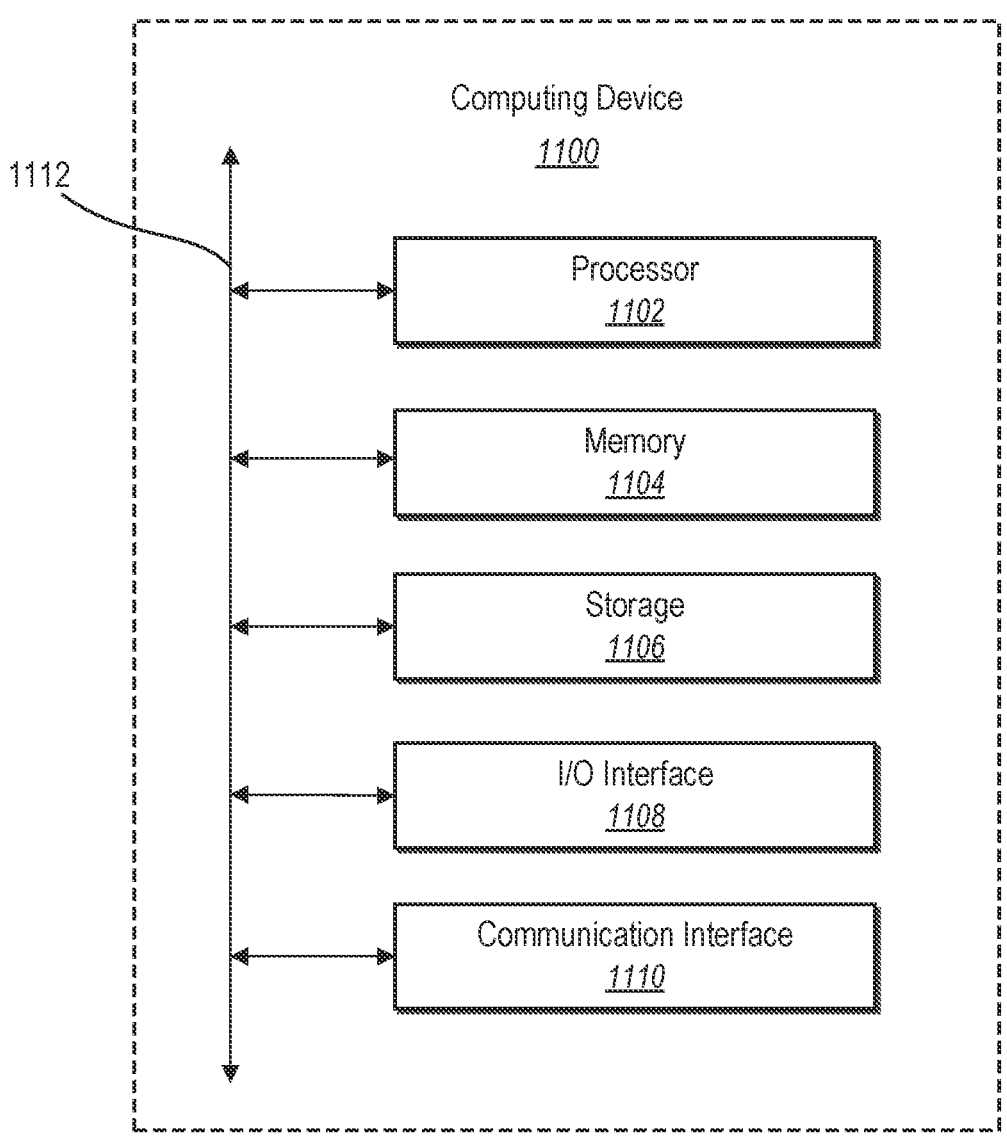
FIG. 11 illustrates a block diagram of an example computing device/processing device in accordance with one or more embodiments.

FIG. 11 illustrates, in block diagram form, an example computing device 1100 (e.g., the computing device 800, the client device 112, and/or the server(s) 104) that may be configured to perform one or more of the processes described above. One will appreciate that the bias correction system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by a computer device, cause the computer device to perform operations comprising:

generating, utilizing a machine learning model, predicted classification probabilities from a plurality of samples comprising a plurality of values for a data attribute;

generating, and storing within one or more memory devices, a decision matrix comprising a plurality of decision thresholds corresponding to the plurality of values for the data attribute;

determining, by comparing the predicted classification probabilities to the plurality of decision thresholds of the decision matrix, that the machine learning model fails to satisfy a fairness deviation constraint associated with a decision threshold of the plurality of decision thresholds with respect to a value of the data attribute;

pruning, in response to determining that the machine learning model fails to satisfy the fairness deviation constraint, the decision threshold to generate a modified decision matrix for the machine learning model and selecting a modified decision threshold for the value of the data attribute for storage within the one or more memory devices; and applying the modified decision matrix to one or more of the predicted classification probabilities of the machine learning model to generate one or more classifications that satisfy the fairness deviation constraint.

2. The non-transitory computer readable medium of claim 1, further comprising instructions that, when executed by the computer device, cause the computer device to perform operations comprising determining the fairness deviation constraint by:

determining a mean and a deviation in a performance metric of the machine learning model with respect to the data attribute; and determining the fairness deviation constraint utilizing the mean and the deviation in the performance metric of the machine learning model with respect to the data attribute.

3. The non-transitory computer readable medium of claim 1, wherein determining that the machine learning model fails to satisfy the fairness deviation constraint with respect to the value for the data attribute comprises:

generating predicted classifications by comparing a set of the predicted classification probabilities with the decision threshold corresponding to the value of the data attribute from the decision matrix;

determining a performance rate by comparing the predicted classifications with ground truth classifications; and determining that the performance rate fails to satisfy the fairness deviation constraint.

4. The non-transitory computer readable medium of claim 1, wherein determining that the machine learning model fails to satisfy the fairness deviation constraint with respect to the value for the data attribute comprises:

determining a true positive rate or a false positive rate of the machine learning model with respect to the value of the data attribute; and determining that the true positive rate or the false positive rate fails to satisfy the fairness deviation constraint.

5. The non-transitory computer readable medium of claim 1, wherein selecting the modified decision threshold comprises:

determining, utilizing an accuracy model, an accuracy score corresponding to the modified decision threshold for the value of the data attribute; and selecting the modified decision threshold based on the accuracy score.

6. The non-transitory computer readable medium of claim 1, further comprising instructions that, when executed by the computer device, cause the computer device to perform operations comprising:

providing, for display via a user interface of a client device, a first selectable option corresponding to a true positive fairness deviation constraint and a second selectable option corresponding to a false positive deviation constraint; and determining the fairness deviation constraint based on identifying a user interaction with the first selectable option or the second selectable option.

7. The non-transitory computer readable medium of claim 1, further comprising instructions that, when executed by the computer device, cause the computer device to perform operations comprising:

determining, by comparing the modified decision matrix to the predicted classification probabilities, that the machine learning model fails to satisfy the fairness deviation constraint with respect to an additional value of the data attribute; and generating the modified decision matrix for the machine learning model by selecting an additional modified decision threshold for the additional value of the data attribute.

8. The non-transitory computer readable medium of claim 1, wherein the plurality of samples comprise an additional plurality of values corresponding to an additional data attribute and further comprising instructions that, when executed by the computer device, cause the computer device to perform operations comprising:

determining, by comparing the decision matrix to the predicted classification probabilities, that the machine learning model fails to satisfy an additional fairness deviation constraint with respect to an additional value of the additional data attribute; and generating the modified decision matrix for the machine learning model by selecting an additional modified decision threshold for the additional value of the additional data attribute.

9. The non-transitory computer readable medium of claim 1, wherein the plurality of samples comprise an additional plurality of values corresponding to an additional data attribute, and further comprising instructions that, when executed by the computer device, cause the computer device to perform operations comprising:

determining a dependency between the data attribute and the additional data attribute; and pruning decision thresholds corresponding to the additional data attribute based on the dependency.

10. A system comprising:

one or more memory devices; and one or more computer devices coupled to the one or more memory devices, the one or more computer devices configured to perform operations comprising:

generating, utilizing a machine learning model, predicted classification probabilities from a plurality of samples comprising a plurality of values for a data attribute;

generating, and storing within the one or more memory devices, a decision matrix comprising a plurality of decision thresholds corresponding to the plurality of values for the data attribute;

determining, by comparing the predicted classification probabilities to the plurality of decision thresholds of the decision matrix, that the machine learning model fails to satisfy a fairness deviation constraint associated with a decision threshold of the plurality of decision thresholds with respect to a value of the data attribute;

pruning, in response to determining that the machine learning model fails to satisfy the fairness deviation constraint, the decision threshold to generate a modified decision matrix for the machine learning model and selecting a modified decision threshold for the value of the data attribute for storage within the one or more memory devices; and applying the modified decision matrix to one or more of the predicted classification probabilities of the machine learning model to generate one or more classifications that satisfy the fairness deviation constraint.

11. The system of claim 10, wherein the operations further comprise determining the fairness deviation constraint by identifying user selection of a true positive fairness deviation constraint or a false positive fairness deviation constraint.

12. The system of claim 10, wherein the operations further comprise determining the fairness deviation constraint by:

determining a performance mean and a performance deviation of the machine learning model with respect to the data attribute; and determining the fairness deviation constraint by identifying a window of performance rates defined by the performance deviation relative to the performance mean.

13. The system of claim 12, wherein determining that the machine learning model fails to satisfy the fairness deviation constraint with respect to the value of the data attribute comprises:

determining a performance rate of the machine learning model with respect to the value of the data attribute; and determining that the performance rate falls outside of the window of performance rates defined by the performance deviation relative to the performance mean.

14. The system of claim 13, wherein determining the performance rate of the machine learning model comprises:

generating predicted classifications by comparing a set of the predicted classification probabilities with the decision threshold corresponding to the value of the data attribute from the decision matrix; and comparing the predicted classifications with ground truth classifications.

15. The system of claim 10, wherein the operations further comprise selecting the modified decision threshold utilizing a precision-recall model.

16. The system of claim 10, wherein the plurality of samples comprise an additional plurality of values corresponding to an additional data attribute and the operations further comprise;

determining a sub-population comprising the value of the data attribute and comprising an additional value of the additional data attribute;

determining, by comparing the decision matrix to the predicted classification probabilities, that the machine learning model fails to satisfy the fairness deviation constraint with respect to the sub-population; and generating the modified decision matrix by selecting the modified decision threshold for the sub-population.

17. The system of claim 10, wherein the plurality of samples comprise an additional plurality of values corresponding to an additional data attribute and the operations further comprise;

determining a sub-population comprising the value of the data attribute and comprising an additional value of the additional data attribute;

determining a number of samples from the plurality of samples corresponding to the sub-population; and pruning decision thresholds corresponding to the sub-population based on the number of samples.

18. A method comprising:

generating, utilizing a machine learning model, predicted classification probabilities from a plurality of samples, wherein the plurality of samples comprise a plurality of values for a data attribute;

generating, and storing within one or more memory devices, a decision matrix comprising a plurality of decision thresholds corresponding to the plurality of values for the data attribute;

determining, by comparing the predicted classification probabilities to the plurality of decision thresholds of the decision matrix, that the machine learning model fails to satisfy a fairness deviation constraint associated with a decision threshold of the plurality of decision thresholds with respect to a value of the data attribute;

pruning, in response to determining that the machine learning model fails to satisfy the fairness deviation constraint, the decision threshold to generate a modified decision matrix for the machine learning model and selecting a modified decision threshold for the value of the data attribute for storage within the one or more memory devices; and generating classifications for the plurality of samples by comparing the predicted classification probabilities from the machine learning model and the modified decision threshold corresponding to the value of the data attribute.

19. The method of claim 18, further comprising: determining a first decision threshold corresponding to a first value of a first protected data attribute from the decision matrix;

determining a second decision threshold corresponding to a second value of a second protected data attribute from the decision matrix; and determining a decision threshold for the first value of the first protected data attribute and the second value of the second protected data attribute within the decision matrix by combining the first decision threshold and the second decision threshold.

20. The method of claim 18, wherein generating the classifications comprises generating a negative classification in response to determining that the predicted classification probabilities from the machine learning model fails to satisfy the decision threshold corresponding to the value of the data attribute.

* * * * *